US010503406B2

(12) United States Patent
Kang

(10) Patent No.: US 10,503,406 B2
(45) Date of Patent: Dec. 10, 2019

(54) DATA STORAGE DEVICE AND DATA PROCESSING SYSTEM HAVING THE SAME

(71) Applicant: SAMSUNG ELECTRONICS CO., LTD., Suwon-si, Gyeonggi-do (KR)

(72) Inventor: Nam Wook Kang, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 85 days.

(21) Appl. No.: 15/141,397

(22) Filed: Apr. 28, 2016

(65) Prior Publication Data
US 2016/0371031 A1 Dec. 22, 2016

(30) Foreign Application Priority Data
Jun. 22, 2015 (KR) .................. 10-2015-0088574

(51) Int. Cl.
G06F 12/00 (2006.01)
G06F 3/06 (2006.01)
G06F 12/02 (2006.01)

(52) U.S. Cl.
CPC .............. *G06F 3/061* (2013.01); *G06F 3/064* (2013.01); *G06F 3/0605* (2013.01); *G06F 3/0616* (2013.01); *G06F 3/0632* (2013.01); *G06F 3/0679* (2013.01); *G06F 12/0246* (2013.01)

(58) Field of Classification Search
CPC ...... G06F 3/061; G06F 3/0605; G06F 3/0616; G06F 3/0632; G06F 3/064; G06F 3/0679; G06F 12/0246
See application file for complete search history.

(56) References Cited

U.S. PATENT DOCUMENTS

| 6,148,377 A * | 11/2000 | Carter ................. G06F 9/5016 707/E17.12 |
| 7,657,572 B2 | 2/2010 | Raciborski et al. |
| 8,244,961 B2 | 8/2012 | Luo et al. |
| 8,352,676 B2 | 1/2013 | Kawamura et al. |
| 8,397,011 B2 | 3/2013 | Ashwood |
| 8,429,327 B2 | 4/2013 | Kim et al. |
| 8,760,922 B2 | 6/2014 | Lassa |
| 2012/0059977 A1 | 3/2012 | Chuang |
| 2012/0278538 A1 | 11/2012 | Nango et al. |
| 2013/0185487 A1* | 7/2013 | Kim ..................... G06F 3/0605 711/103 |
| 2014/0025770 A1* | 1/2014 | Warfield .......... G06F 15/17331 709/213 |
| 2014/0189210 A1 | 7/2014 | Sinclair et al. |

(Continued)

FOREIGN PATENT DOCUMENTS

| KR | 100704037 | 3/2007 |
| KR | 20130063244 A | 6/2013 |

*Primary Examiner* — Shawn X Gu
(74) *Attorney, Agent, or Firm* — Volentine, Whitt & Francos, PLLC

(57) ABSTRACT

A data storage device includes a plurality of scale-out storage devices, and a controller configured to determine a characteristic of data and configured to transmit and receive the data to or from a first scale-out storage device among the plurality of scale-out storage devices based on the determined characteristic. Each of the plurality of scale-out storage devices includes a volatile memory, a nonvolatile memory, and a scale-out controller configured to control the volatile memory and the nonvolatile memory.

16 Claims, 19 Drawing Sheets

(56) References Cited

U.S. PATENT DOCUMENTS

2014/0281172 A1    9/2014  Seo et al.
2016/0062699 A1*  3/2016  Samuels ............... G06F 3/0649
                                                             711/103

* cited by examiner

FIG. 11

| TABLE1 | TB1 |
|---|---|
| Logical Address | Scale-Out Storage Device |
| LA0~LA0999 | 410/410-1 |
| LA1000~LA1999 | 430/430-1 |
| LA2000~LA2999 | ⋮ |
| LA3000~LA3999 | 450/450-1 |

FIG. 15

TABLE6

| TYPE | Clock Frequecy | DRAM Capacity/ BANDWIDTH | PROGRAM METHOD | FTL Mapping Size | OVP RATIO | CAPACITY |
|---|---|---|---|---|---|---|
| TYPE1 | LOW | 2GB/LOW | SLC | 8KB | 10% | 1TB |
| TYPE2 | HIGH | 4GB/HIGH | MLC/SLC | 4KB | 25% | 1TB |
| TYPE3 | LOW | 2GB/LOW | TLC | 8KB | 5% | 1TB |
| TYPE4 | MIDDLE | 4GB/HIGH | MLC/SLC | 4KB | 20% | 512GB |

TB2

DATA STORAGE DEVICE AND DATA PROCESSING SYSTEM HAVING THE SAME

CROSS-REFERENCE TO RELATED APPLICATION

A claim of priority under 35 U.S.C. § 119(a) is made to Korean Patent Application No. 10-2015-0088574 filed on Jun. 22, 2015, the entire contents of which are hereby incorporated by reference.

BACKGROUND

The present inventive concept relates generally to a data storage device, and more particularly, to a data storage device including a controller which transmits and receives data to/from one of scale-out storage devices according to the characteristics of data received from a host, and a data processing system including the same.

Memory devices are used to store data. The memory devices can be classified into volatile memory devices and nonvolatile memory devices. Flash memory devices are an example of EEPROM in which memory cells are programmed or erased with a single operation. For example, a program or read operation may be performed by unit of a page, and an erase operation may be performed by unit of a block. The block may include a plurality of pages.

A flash memory device may include a plurality of flash memory chips. The lifetime of performance of the flash memory device may be determined according to one of the plurality of flash memory chips. For example, if one of the plurality of flash memory chips is worn-out, or performance of the flash memory chip is decreased, the overall lifetime or performance of the flash memory device may be degraded.

SUMMARY

Embodiments of the inventive concept provide a data storage device. The data storage device includes a plurality of scale-out storage devices and a controller configured to determine a characteristic of data. The controller is configured to transmit and receive the data to/from a first scale-out storage device among the plurality of scale-out storage devices based on the determined characteristic. Each of the plurality of scale-out storage devices includes a volatile memory, a nonvolatile memory, and a scale-out controller configured to control the volatile memory and the nonvolatile memory.

The controller determines a type of each scale-out storage device, and the controller transmits and receives the data to/from the first scale-out storage device based on the type of each scale-out storage device determined by the controller and the determined characteristic. The controller includes a user interface that receives a user input for determining the type of each scale-out storage device. The controller includes a type formatter that determines the type of each scale-out storage device based on the user input, and the controller transmits and receives the data to/from the first scale-out storage device based on the determined characteristic and the type of each scale-out storage device determined by the type formatter. The data storage device further includes a memory configured to store a type formatter and a classifier, and a CPU configured to execute the type formatter and the classifier. The type formatter determines a type of the each scale-out storage device based on the use input, and the classifier determines the characteristic of the data. The classifier transmits and receives the data to/from the first scale-out storage device based on the type of each scale-out storage device determined by the type formatter and the determined characteristic.

The characteristic of the data is determined by a logical address of the data. The controller transmits and receives the data to/from the first scale-out storage device based on the determined characteristic and an operation frequency of the controller. The data storage device includes an external volatile memory connected to the controller. The controller transmits and receives the data to/from the first scale-out storage device based on the determined characteristic and a bandwidth of the external volatile memory. The controller transmits and receives the data to/from the first scale-out storage device based on the determined characteristic and a program method regarding memory cells included in the nonvolatile memory. The controller transmits and receives the data to/from the first scale-out storage device based on the determined characteristic and a mapping size of a flash translation layer (FTL) that manages stored data in the nonvolatile memory. The controller transmits and receives the data to/from the first scale-out storage device based on the determined characteristic and a ratio of a user data region and an over-provisioning region of the nonvolatile memory. The controller transmits and receives the data to the first scale-out storage device based on the determined characteristic and a capacity of the nonvolatile memory.

The controller determines a characteristic of the volatile memory and a characteristic of the nonvolatile memory, and the controller determines an operation frequency of the controller. The controller transmits and receives the data to/from the first scale-out storage device based on at least one of the determined characteristic of the data, the determined characteristic of the volatile memory, the determined characteristic of the nonvolatile memory, and the determined operation frequency. The characteristic of the volatile memory is determined by a bandwidth. The characteristic of the nonvolatile memory includes at least one of a program method regarding memory cells included the nonvolatile memory, a mapping size of the FTL that manages stored data in the nonvolatile memory, a ratio of a user data region and an over-provisioning region of the nonvolatile memory, and a capacity of the nonvolatile memory. The data may be hot data or cold data. The data is program data or read data. The data may be random data or sequential data. The data may be user data or meta data. The volatile memory and the scale-out controller are packaged in a multi-chip package. The volatile memory may be a DRAM, and the nonvolatile memory may be a flash memory. The data storage device may be a solid state drive.

Embodiments of the inventive concept provide a data processing system that includes a host, and a data storage device connected to the host via an interface. The data storage device includes a plurality of scale-out storage devices and a controller configured to determine a characteristic of data that is transmitted and received to/from the host via the interface. The controller is configured to transmit and receive the data to/from a first scale-out storage device among the plurality of scale-out storage devices based on the determined characteristic. Each of the plurality of scale-out storage devices includes a volatile memory, a nonvolatile memory, and a scale-out controller configured to control the volatile memory and the nonvolatile memory.

The data storage device includes a user interface configured to receive a user input in order to determine a type of each of the plurality of scale-out devices, and the controller configured to determine the type of each of the plurality of scale-out devices. The controller transmits and receives the data to/from the first scale-out storage device based on the determined type and the determined characteristic. The data storage device further includes a DRAM that is connected to the controller. The controller transmits and receives the data to/from the first scale-out storage device based on at least one of the determined characteristic, an operation frequency of the controller, a bandwidth of the DRAM, a program method regarding memory cells included in the nonvolatile memory of each of the plurality of scale-out storage device, a mapping size of an FTL that manages stored data in the nonvolatile memory, a ratio of a user data region and an over-provisioning region of the nonvolatile memory, and a capacity of the nonvolatile memory.

The controller determines a characteristic of the volatile memory and a characteristic of the nonvolatile memory included in each of the plurality of scale-out storage device. The controller determines an operation frequency of the controller. The controller transmits and receives the data to/from the first scale-out storage device based on at least one of the determined characteristic of the data, the determined characteristic of the volatile memory, the determined characteristic of the nonvolatile memory, and the determined operation frequency. The characteristic of the volatile memory is determined by a bandwidth. The characteristic of the nonvolatile memory includes at least one of a program method regarding memory cells included in the nonvolatile memory, a mapping size of an FTL that manages stored data in the nonvolatile memory, a ratio of a user data region and an over-provisioning region of the nonvolatile memory, and a capacity of the nonvolatile memory. The characteristic of the data is determined by a logical address of the data. The data may be one of hot data, cold data, program data, read data, random data, sequential data, user data and meta data.

Embodiments of the inventive concept provide a method of operating a data processing system including a data storage device that transmits and receives data to/from a host via an interface. The method includes determining a characteristic of the data, and based on the determined characteristic, transmitting and receiving the data to/from a first scale-out storage device among a plurality of scale-out storage devices. The data storage device includes the plurality of scale-out storage devices, and each of the plurality of scale-out storage devices includes a volatile memory, a nonvolatile memory and a scale-out controller that controls the volatile memory and the nonvolatile memory.

The method further includes receiving a user input to determine a type of each of the plurality of scale-out storage devices, determining the type of each of the plurality of scale-out storage devices based on the user input, selecting the first scale-out storage device among the plurality of scale-out storage devices based on the determined characteristic and the determined type, and transmitting and receiving the data to/from the first scale-out storage device. The data storage device is included in a data base, and the host may be a database server that controls the data base. The volatile memory may be a DRAM, and the nonvolatile memory may be a flash memory. The data storage device may be a solid state drive.

BRIEF DESCRIPTION OF THE DRAWINGS

The above and other features and advantages of the inventive concept will become more apparent upon consideration of certain embodiments illustrated in the accompanying drawings.

FIG. 11 is a table listing exemplary logical addresses assigned to the scale-out storage devices, according to an embodiment of the inventive concept.

FIG. 15 is a table illustrating a method of classifying the scale-out storage devices to corresponding type of the data characteristic, according to an embodiment of the inventive concept.

DETAILED DESCRIPTION

Figure 1:
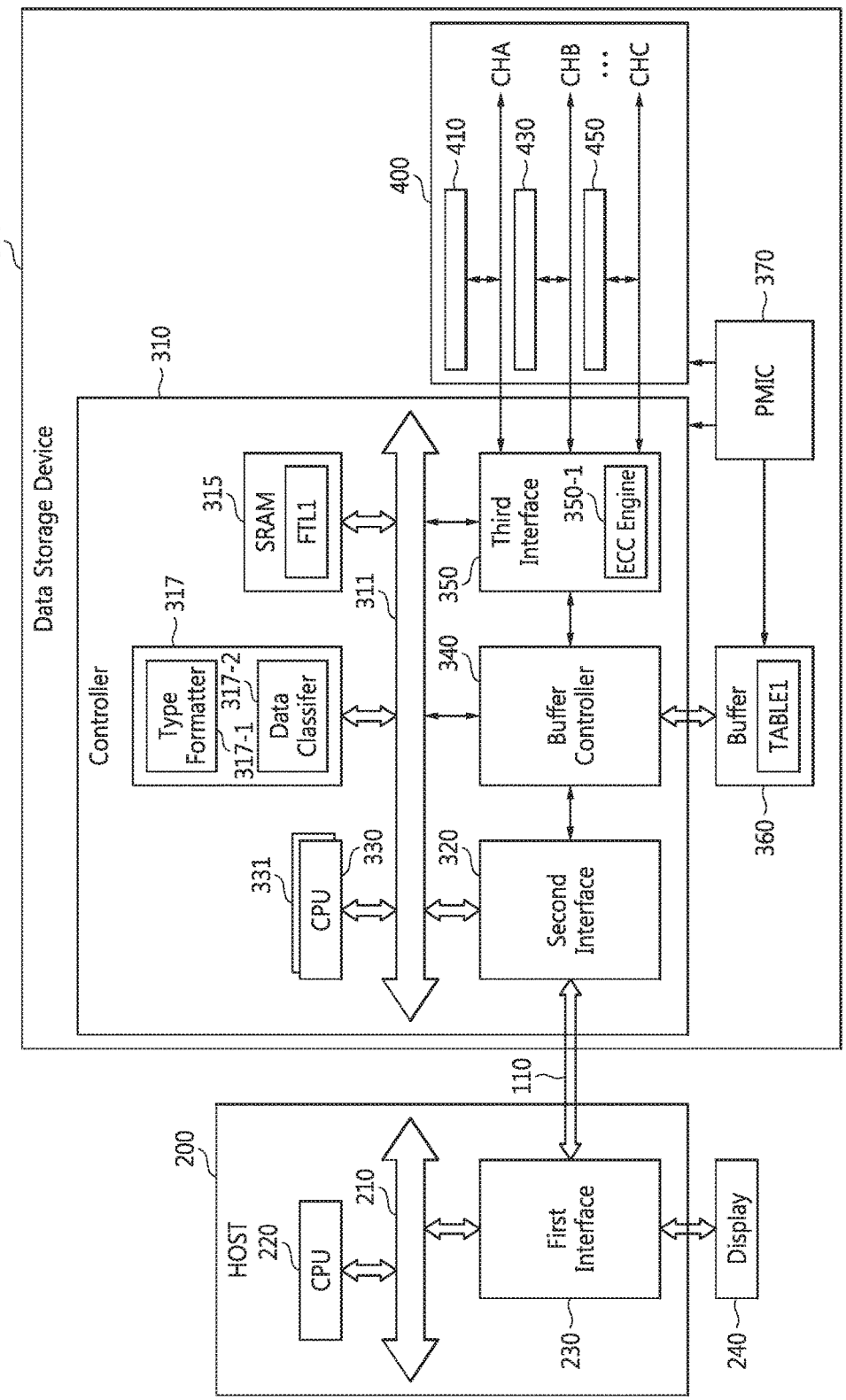
FIG. 1 is a block diagram illustrating a data processing system, according to an embodiment of the inventive concept.

Certain embodiments of the inventive concept will now be described with reference to the accompanying drawings. However, the inventive concept may be variously embodied and should not be construed as being limited to only the illustrated embodiments. Throughout the written description and drawings, like reference numbers denote like or similar elements.

It should be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concept. As used herein, the term "and/or" includes any and all combinations of one or more of the associated listed items.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion e.g., "between" versus "directly between", "adjacent" versus "directly adjacent", etc.

The terminology used herein is for the purpose of describing particular embodiments only and is not intended to be limiting of example embodiments of the inventive concept. As used herein, the singular forms "a", "an" and "the" are intended to include the plural forms as well, unless the context clearly indicates otherwise. It should be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in relation to certain illustrated embodiments, certain functions, acts, and/or steps may be performed in an order other than the specific order described in relation to illustrated embodiments. Further, two or more functions, acts and/or steps shown as occurring in succession may, in fact, be executed substantially concurrently or may sometimes be executed in a reverse order depending on the functionality, acts and/or steps involved.

Unless otherwise defined, all terms, including technical and scientific terms, used herein have the same meaning as commonly understood by one of ordinary skill in the art to which example embodiments of the inventive concept belong. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

There are described herein scale-up and scale-out as to manners of increasing data processing performance of a data storage device or a data server including the data storage device. The scale-up increases a capacity of the data server. Thus, data processing capacity of the data server is improved. It is referred to as "vertical scaling". The scale-out increases the number of connect data servers. Therefore, data processing capacity of the system including the data servers is improved. It is referred to as "horizontal scaling".

In a data storage device including a scale-up structure, if the number of nonvolatile memory devices increases, it may increase a loading capacitance of interface implemented between the nonvolatile memory devices and a controller of the nonvolatile memory devices. Therefore, the data processing capacity of the data storage device may decrease. The data storage device may include the scale-out structure.

As used herein, the scale-out storage device may include a volatile memory, at least one nonvolatile memory, and a scale-out controller for controlling the volatile memory and at least one nonvolatile memory. If the volatile memory, at least one nonvolatile memory, and the scale-out controller are separately implemented by a semiconductor chip or a semiconductor package, the scale-out storage device may be referred to as a multi-chip set. The scale-out controller may mean a core.

FIG. 1 is a block diagram illustrating a data processing system, according to an embodiment of the inventive concept. Referring to FIG. 1, the data processing system 100 includes a host 200, a display 240 connected to the host 200, an interface 110, and a data storage device 300 for transmitting and receiving data and/or command to/from the host via the interface 110.

Figure 2A:
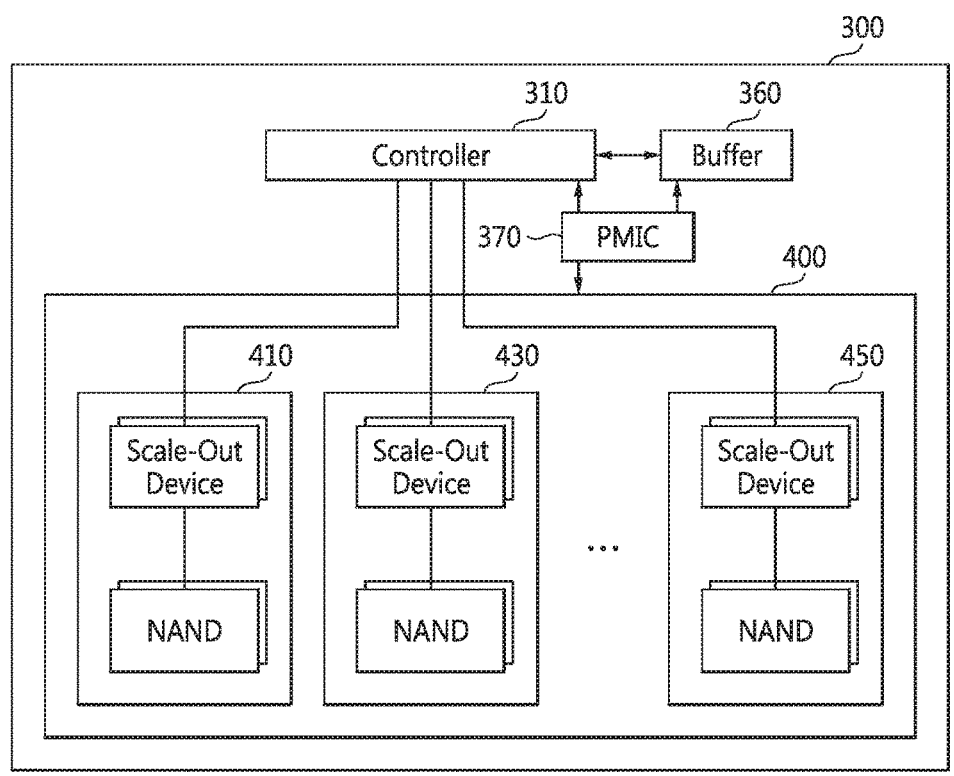
FIG. 2A is a block diagram further illustrating the data storage device of FIG. 1, according to an embodiment of the inventive concept.
Figure 2B:
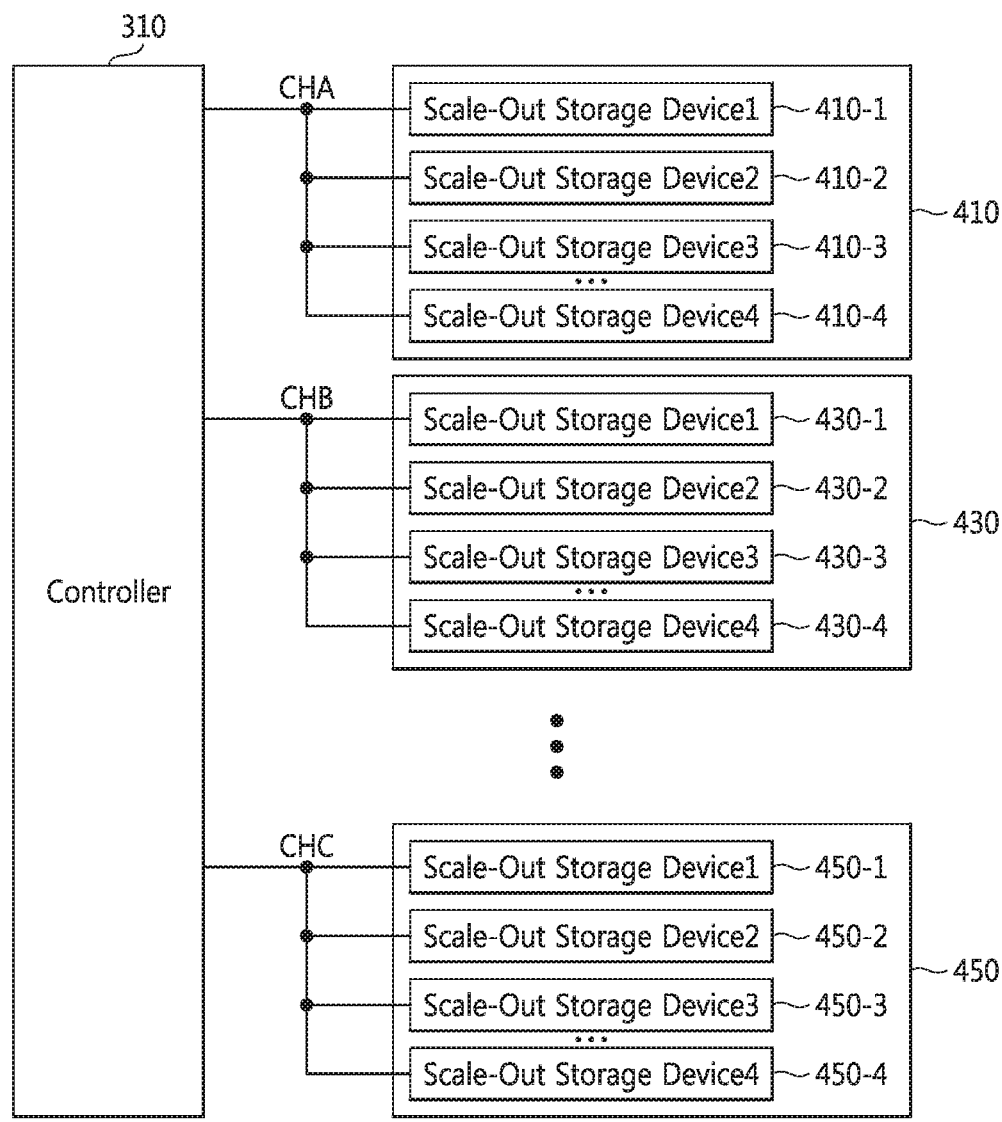
FIG. 2B is a block diagram further illustrating the data storage device of FIG. 1, according to another embodiment of the inventive concept.

The data storage device 300 may be implemented as the scale-out structure, when structure of a memory cluster 400 included in the data storage device 300 is the structure illustrated in FIG. 2A or FIG. 2B. For example, the data processing system 100 may mean a memory system.

For example, the data processing system may be a personal computer (PC), a workstation, a data center, an internet data center (IDC), a storage area network (SAN), a network attached storage (NAS), or a mobile computing device. However, it is not limited thereto.

The mobile computing device including the memory cluster 400 may be a laptop computer, a cellular, a smart phone, a tablet PC, a personal digital assistant (PDA), an enterprise digital assistant (EDA), a digital still camera, a digital video camera, a portable navigation device, a handheld game console, a mobile internet device (MID), a wearable computer, an internet of things (IoT) device, an internet of everything (IoE) device, a drone, and an e-book, etc. However, it is not limited thereto.

The interface may be, for example, a serial advanced technology attachment (SATA) interface, a SATA express (SATAe) interface, a serial attached small computer system interface (SCSI), a peripheral component interconnect express (PCIe) interface, a nonvolatile memory express (NVMe) interface, an advanced host controller interface (AHCI), and/or a multimedia card (MMC) interface, etc. However, it is not limited thereto. According to embodiments of the inventive concept, the interface 110 may transmit electrical signals or optical signals. The interface 110 may be, for example, a wired interface or a wireless interface.

The host 200 may control a data processing operation (for example, write operation or read operation) via the interface 110. The host 200 may mean a host controller.

The host 200 may provide a user interface to a user. The user may set a range of a logical address of each scale-out storage device via the user interface displayed on the display 240. The user may set a characteristic of data of each scale-out storage device via the user interface displayed on the display 240. For example, the user interface may be a graphic user interface (GUI).

The CPU 220 may transmit and receive command and/or data to/from the first interface 230 via the bus 210. In FIG. 1, the host 200 as illustrated includes the bus 210, a CPU 220, and the first interface 230. However, the inventive concept is not limited thereto.

The host 200 may be, for example, an integrated circuit (IC), a motherboard, a system on chip (SoC), an application processor (AP), a mobile AP, a web server, a data server, and a database server.

For example, the bus 210 may be an advanced microcontroller bus architecture (AMBA), an advanced high-performance bus (AHB), an advanced peripheral bus (APB), an advanced extensible interface (AXI), an advanced system bus (ASB), an AXI coherency extensions (ACE). However, the bus 210 is not limited thereto.

The CPU 220 may generate a write request to control a write operation of the data storage device 300. The CPU 220 may generate a read request to control a read operation. The write request may include a write address (for example, logical address). The read request may include a read address (for example, logical address). For example, the CPU 220 may include at least one core. The write and read requests may mean commands.

The first interface 230 may change a data format and/or a command format for transmitting to the data storage device 300. The first interface may transmit the data and/or command having the changed format to the data storage device 300 via the interface 110. The first interface may change a format of a response and/or data received from the data storage device 300. The first interface 230 may transmit the response and/or the data having the changed format to the CPU 220 via the bus 210. For example, the first interface 230 may include a transmitter-receiver which is capable of transmitting and receiving data and/or a command. Structure and an operation of the first interface 230 may be implemented to be compatible with the structure and operation of the interface 110.

The first interface 230 may control operations of the display 240. The first interface 230 may transmit user data received via a touch pad or a touch screen included in the display 240, to the CPU 220.

The data storage device 300 includes a controller 310, a buffer 360, a power management IC 370, and a memory cluster 400. Herein, the memory cluster 400 may be a set of memory devices. Also, the memory cluster 400 may include the scale-out devices and the memory device illustrated in FIG. 2A through FIG. 7.

The data storage device 300 may be implemented as a flash-based memory device. For example, the data storage device 300 may be a solid-state driver or solid-state disk (SSD), an embedded SSD, a universal flash storage (UFS), a multimedia card (MMC), an embedded MMC, and a managed NAND. However, this is not limited thereto. For example, the flash-based memory device may be implemented as a NAND-type flash memory device or a NOR-type flash memory device.

The flash-based memory device may include a memory cell array. The memory cell array may include a plurality of memory cells. For example, the memory cell array may include a 2-dimensional memory cell array or a 3-dimnesional memory cell array.

The 3-dimensional memory cell array may be formed monolithically in at least one physical level of a memory cell array having an active region disposed on or above a silicon substrate. The 3-dimensional memory cell array may include a circuit regarding operations of the memory cells. The circuit may be formed on or above the substrate. The term, "monolithic," may mean that layers of each level of an array are directly deposited on layers of each underlying level of the array. The 3-dimensional memory cell array may include vertical NAND strings in which at least one memory cell is oriented vertically on the other memory cell. At least one memory cell may include a charge trap layer.

For example, the data storage device 300 may be a hard disk drive (HDD), a phase change RAM (PRAM) device, a magnetoresistive RAM (MRAM) device, a spin-transfer torque MRAM (STT-MRAM) device, a ferroelectric RAM (FRAM) device or a resistive RAM (RRAM) device.

The controller 310 may control data and/or command transmission between the host 200, the buffer 360, and a memory cluster 400. The controller 310 may control data processing. For example, the controller 310 may be implemented as an IC or an SoC.

The controller 310 may include a bus structure 311, an internal memory 315, a data classification circuit 317, a second interface 320, at least one CPU 330 and/or 331, a buffer controller 340, and a third interface 350. The bus structure 311 may be implemented as AMBA, AHB, APB, AXI, ASB, ACE or any combination of these.

The internal memory 315 may store data desired for operations of the controller 310. The internal memory 315 may store data generated by a data processing operation (for example, write operation or read operation) performed by the controller 310.

For example, the internal memory 315 may store a first flash translation layer (FTL) FTL1 operated by the CPU 330 and/or 331. For example, if the data storage device 300 is booted (booting), the first FTL FTL1 may be loaded to the internal memory 315 from the memory cluster 400. The loaded first FTL may be executed by the CPU 330 and/or 331.

For example, the internal memory 315 may be a random access memory (RAM), a dynamic RAM (DRAM), a static RAM (SRAM), a buffer, a buffer memory, a cache, and a tightly coupled memory (TCM).

The data classification circuit 317 may determine characteristics of data received from the host 200. The data classification circuit 317 may classify the data corresponding to scale-out storage devices according to the determined result. The data classification circuit 317 may transmit the classified data to the corresponding scale-out storage device. Each scale-out storage device may be classified to different type for processing assigned data. Therefore, the controller 310, using the data classification circuit 317, may transmit and receive data to/from the scale-out storage device. In FIG. 1, the data classification circuit 317 is implemented as a separate circuit. However, the data classification circuit may be implemented in any area inside of the controller 310.

The data classification circuit 317 may transmit a logical address to a corresponding scale-out storage device. The logical address may be assigned to the corresponding scale-out storage device by user. Therefore, the controller 310 may transmit and receive data to/from the corresponding scaled-out storage device using the data classification circuit 317.

The data classification circuit 317 includes a type formatter 317-1 and a data classifier 317-2. The type formatter 317-1 may process a format for each scale-out storage device according to a type of default (for example, data characteristic and/or logical address) stored by a user or a manufacturer. The data classifier 317-2 may transmit data to the corresponding scale-out storage device according to data characteristic and/or a logical address. Operations of the type formatter 317-1 and the data classifier 317-2 will be more fully described with reference to FIG. 9 through FIG. 16.

The second interface 320 may change a response format and/or a data format for transmitting to the host 200. The second interface 320 may transmit the response and/or the data having the changed format to the host 200 via the interface 110. Also, the second interface 320 may receive a command and/or data from the host 200. The second interface 320 may change formats of the received command and/or data. The second interface 320 may transmit the command and/or data having the changed format to at least one CPU 330 and/or 331 and/or a buffer controller 340. For example, the second interface 320 may include a transmitter-receiver.

The second interface 320 may be, for example, a SATA interface, a SATAe interface, a SAS interface, a PCIe interface, an NVMe interface, an AHCI interface, an MMC interface, a NAND-type flash memory interface, or a NOR-type flash memory interface. However, the inventive concept is not limited thereto.

The CPU (330 and/or 331) may control the internal memory 315, the data classification circuit 317, the second interface 320, the buffer controller 340, and the third interface 350 via the bus structure 311. The CPU 330 and/or 331 may include at least one core. For example, the CPU 330 and/or 331 may control a Power management integrated circuit (PMIC) 370.

For example, the first CPU 330 may transmit and receive data to/from the host 200 via the second interface 320. The second CPU 331 may transmit and receive the data to/from the memory cluster 400 via the third interface 350. For example, the first CPU 330 and the second CPU 331 may be included in a multi-CPU. For example, the first CPU 330 may control the second CPU 331.

The buffer controller 340 may write data to the buffer 360 according to the control of the first CPU 330 or the second CPU 331. The buffer controller 340 may read data from the buffer 360 according to the control of the first CPU 330 or the second CPU 331. The buffer controller 340 may be referred to as a buffer manager and may control a write operation and a read operation.

The third interface 350 may control, according to the control of the first CPU 330 or the second CPU 331, data processing operations (for example, write operation, read operation, type-specific setting operation, etc) regarding the memory cluster 400 via a main channel among the plurality of main channels (CHA, CHB, . . . , CHC).

For example, the third interface 350 may be a SATA interface, a SATAe interface, a SAS interface, a PCIe interface, an NVMe interface, an AHCI interface, an MMC interface, a NAND-type flash memory interface, and/or a NOR-type flash memory interface.

For example, the third interface 350 may include an error correction code (ECC) engine 350-1. The ECC engine 350-1 may correct errors of data that is to be stored in the memory cluster 400. The ECC engine 350-1 may correct errors of data received from the memory cluster 400. In FIG. 1, the ECC engine 350-1 is illustrated which is included in the third interface 350. According to the inventive concepts, the ECC engine 350-1 may be implemented in any area inside of the controller 310.

The buffer controller 340 may read data from the buffer 360. The buffer controller 340 may write the data to the buffer 360. For example, the buffer 360 may be a nonvolatile memory device, a RAM, an SRAM, and/or a DRAM.

The buffer 360 may include a first region and a second region. The first region may store a mapping table. The mapping table may include information for transforming a logical address to a physical address. The second region may be a cache. For example, the first region may store the first table TABLE1. The first table TABLE1 may be all or a part of the mapping table stored in the first region. The first table TABLE1 will be more fully described with reference to FIG. 11 or FIG. 15.

For example, the CPU 330 and/or 331 may execute the first FTL FTL1. The first FTL may use the mapping table stored in the first region of the buffer 360 for transforming the logical address to the physical address. The first FTL may use the first table TABLE1 for selecting a scale-out storage device corresponding to the logical address. For example, the logical address may be a logical block address LBA or a logical page address LPN. The logical page address may be a local logical page address assigned to each scale-out storage device. The logical page address may be a global logical page address assigned to each scale-out storage device.

According to embodiments of the inventive concept, when each of the controller 310 and the buffer 360 is implemented as a semiconductor chip, the controller 310 and the buffer 360 may be a single package such as a package-on-package (PoP), a multi-chip package (MCP), or a system-in package (SiP). For example, a first chip including the buffer 360 may be stacked above a second chip including the controller 310 via stack balls.

The PMIC 370 may control operation voltages supplied to the controller 310, the buffer 360, and/or the memory cluster 400. For example, a first operation voltage may be supplied to the controller 310. A second operation voltage may be supplied to the buffer 360. A third operation voltage may be supplied to the memory cluster 400. In an embodiment of the inventive concept, the first operation voltage, the second operation voltage, and the third operation voltage may be different from each other. In another embodiment of the inventive concept, the first operation voltage, the second operation voltage, and the third operation voltage may be the same as each other.

The memory cluster 400 may include a plurality of clusters 410, 430, . . . , 450. The first cluster 410 may be connected to the first main channel CHA. The second cluster 430 may be connected to the second main channel CHB. The third cluster 450 may be connected to the third main channel. Each cluster may include at least one scale-out storage device. Structure of each cluster will be more fully described with reference to FIG. 2A through FIG. 7.

According to embodiments of the inventive concept, the main channel may be an independent data path disposed between the third interface 350 and a corresponding cluster. The data path may include transmission lines to transmit data and/or control signals.

The term, "way," is used to refer to as a group of nonvolatile memory devices sharing a single main channel. The group may include at least one nonvolatile memory device. Therefore, a plurality of ways may be connected to a single main channel. The nonvolatile memory device may be a die, a memory device, and/or a semiconductor package. The controller 310 may control A-channel*B-way. Herein, each of A, B is a natural number equal to or greater than one.

Figure 3:
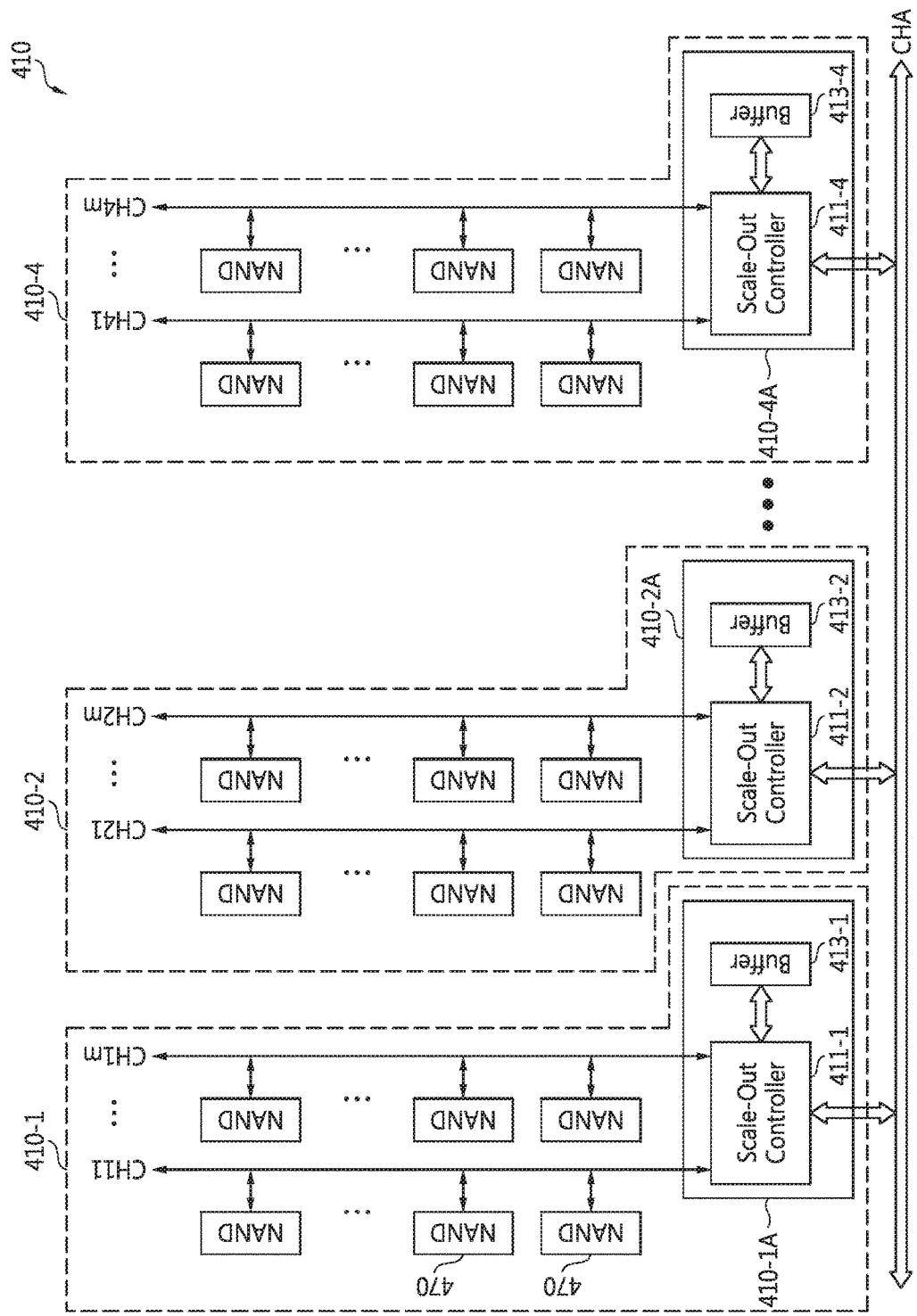
FIG. 3 is a block diagram illustrating the first cluster of FIG. 2, according to an embodiment of the inventive concept.

FIG. 2A is a block diagram further illustrating the data storage device of FIG. 1, according to an embodiment of the inventive concept. FIG. 2B is a block diagram further illustrating the data storage device of FIG. 1, according to another embodiment of the inventive concept. FIG. 3 is a block diagram further illustrating one example of the first cluster of FIG. 2. The data storage device 300 of FIG. 2a, and FIG. 2b may be implemented as a data storage device having scale-out structure.

Each cluster 410, 430, . . . , 450 may include at least one scale-out storage device (or multi-chip set). The first cluster 410 may include a plurality of scale-out storage devices 410-1~410-4. The second cluster 430 may also include a plurality of scale-out storage devices 430-1~430-4. Similarly, the third cluster 450 may include a plurality of scale-out storage devices 450-1~450-4. Each cluster 410, 430, . . . , 450 may include the same number of scale-out storage devices. Or, each cluster 410, 430, . . . , 450 may include a different number of scale-out storage devices.

The scale-out device may include a scale-out controller, a volatile memory, and at least one nonvolatile memory device (for example, NAND-type flash memory device).

Referring to FIG. 1 through FIG. 3, it is assumed that structure and an operation of each cluster 410~450 may be the same. Therefore, structure and the operation of the first cluster 410 may be representatively described. Referring to FIG. 3, the first cluster 410 may include a plurality of scale-out storage devices 410-1~410-4. In FIG. 3, 4 scale-out storage devices 410-1~410-4 are illustrated. According to embodiments of the inventive concept, the number of scale-out storage devices included in the first cluster 410 is not limited thereto.

The first cluster 410 may include scale-out devices (410-1A, 410-2A, 410-4A), and NAND-type flash memory devices. The NAND-type devices may be connected to the corresponding scale-out devices.

The first scale-out storage device 410-1 may include a first scale-out device 410-1A and a nonvolatile memory devices NAND connected to the first scale-out device 410-1A. The second scale-out storage device 410-2 may include a second scale-out device 410-2A and nonvolatile memory devices connected to the second scale-out device 410-2A. The fourth scale-out storage device 410-4 may include a fourth scale-out device 410-4A and nonvolatile memory devices connected to the fourth scale-out device 410-4A.

Each scale-out device 410-1A, 410-2A, . . . , 410-4A may respectively include a scale-out controller 411-1, 411-2, . . . , 411-4, and nonvolatile memory devices 413-1, 413-2, . . . , 413-4. Structures of scale-out controllers 411-1, 411-2, . . . , 411-4 may be identical.

The first scale-out controller 411-1 may be connected to the first main channel CHA, channels CH11 through CH1m (m is a natural number equal to or greater than two), and a first volatile memory device 413-1. Each channel CH11~CH1m may be connected to corresponding nonvolatile memory devices. For example, each of the nonvolatile memory devices may be a NAND-type flash memory device or a managed NAND flash memory device. Herein, each channel may be an independent data path located between the first scale-out controller 411-1 and corresponding nonvolatile memory devices.

The first scale-out controller 411-1 may control operations of the nonvolatile memory devices via channels CH11~CH1m. For example, the controller 310 may control operations of the first scale-out controller 411-1 via the first main channel CHA.

The first volatile memory device 413-1 may include the first region. The first region may store a mapping table. The mapping table may include mapping information regarding a logical address and a physical address of nonvolatile memory devices connected to each of the channels CH11~CH1m. The first volatile memory device 413-1 may include the second region (or cache region). The second region may temporary store data to write to one of the nonvolatile memory devices connected to the channels CH11~CH1m. The second region may temporary store data received from one of the nonvolatile memory devices.

Figure 7:
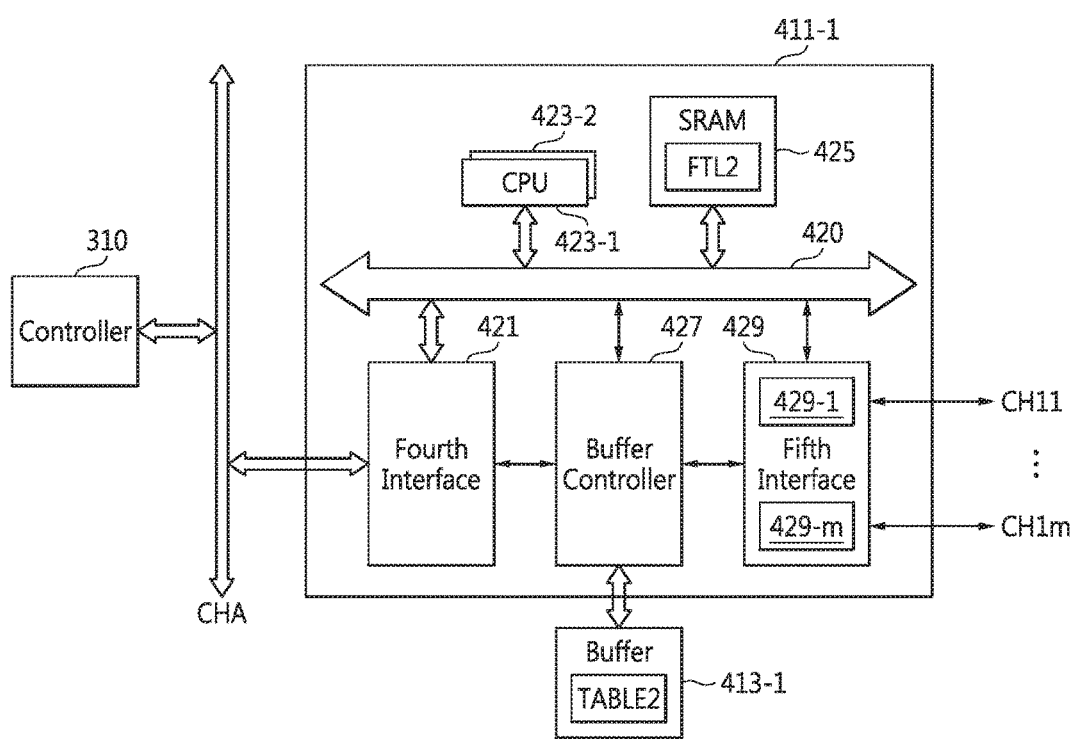
FIG. 7 is a block diagram illustrating the first scale-out controller of FIG. 4, according to an embodiment of the inventive concept.

For example, as illustrated in FIG. 7, the second FTL FTL2 may transform the logical address to the physical address using the mapping table stored in the first region of the first volatile memory device 413-1. The second FTL FTL2 may be executed by the CPU 423-1 or 423-2 included in the first scale-out controller 411-1. The second FTL FTL2 may be loaded from the nonvolatile memory device included in the first cluster 410, to the internal memory 425. The loaded second FTL may be executed by the CPU 423-1 or 423-2.

The second scale-out controller 411-2 may be connected to the first main channel CHA, channels CH21~CH2m, and the second memory device 413-2. The channels may be connected to corresponding nonvolatile memory devices (for example, NAND flash memory), respectively.

The second scale-out controller 411-2 may control operations of the nonvolatile memory devices via the channels CH21~CH2m. For example, the controller 310 may control an operation of the second scale-out controller 415-2 via the main channel CHA.

The second volatile memory device 413-2 may include a first region. The first region may store mapping information (or mapping table) regarding a logical address and physical address of the nonvolatile memory devices connected to each channels CH21~CH2m. The second volatile memory device 413-2 may include a second region (or cache region). The second region may temporary store data to write to one of the nonvolatile memory devices connected to the channels CH21~CH2m. The second region may temporary store the data read from one of the nonvolatile memory devices connected to the channels CH21~CH2m.

As illustrated in FIG. 7, when structure of the first scale-out controller 411-1 is the same as structure of the second scale-out controller 411-2, the CPU 423-1 or 423-2 of the second scale-out controller 411-2 may execute the third FTL. The third FTL may transform a logical address to a physical address using the mapping table stored in the first region of the second volatile memory device 413-2. The third FTL may be loaded from the nonvolatile memory device of the first cluster 410 to the internal memory 425. The loaded third FTL may be executed by the CPU 423-1 or 423-2.

The fourth scale-out controller 411-4 may be connected to the first main channel CHA, channels CH41~CH4m, and the fourth volatile memory device 413-4. The channels CH41~CH4m may be connected to corresponding nonvolatile memory devices, respectively.

The fourth scale-out controller 411-4 may control each nonvolatile memory device via each of the channels CH41~CH4m. For example, the controller 310 may control operations of the fourth scale-out controller 411-4 via the main channel CHA.

The fourth volatile memory device 413-4 may include a first region. The first region may store a mapping information (or mapping table) regarding a logical address and a physical address of a corresponding nonvolatile memory device connected to the channels CH41~CH4m. The fourth volatile memory device 413-3 may include a second region (or cache region) to store data for writing to at least one of the nonvolatile memory devices connected to each of the channels CH41~CH4m. The second region may store data read from at least one of nonvolatile memory devices connected to each of the channels CH41~CH4m.

As described in FIG. 7, when structure of the first scale-out controller 411-1 is the same as structure of the fourth scale-out controller 411-4, a fifth FTL may transform the logical address to physical address using the mapping table stored the first region of the fourth volatile memory device 413-4. The fifth FTL may be executed by a CPU 423-1 or 423-2 included in the fourth scale-out controller 411-4. The fifth FTL may be loaded to the internal memory 425 from the nonvolatile memory device of the first cluster 410. The loaded fifth FTL may be executed by the CPU 423-1 or 423-2.

The volatile memory devices 413-1~413-4 may be buffers or a buffer memory, a RAM, an SRAM, and/or a DRMA.

In FIG. 3, the scale-out storage devices 410-1~410-4 include the same number of channels, respectively. However, the number of channels included in each scale-out storage device may be different from each other.

Figure 4:
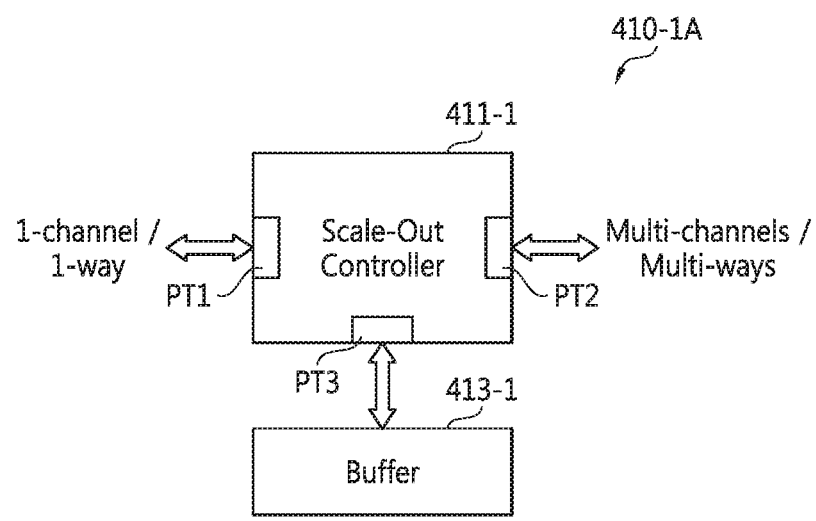
FIG. 4 is a block diagram illustrating the first scale-out device of FIG. 3, according to an embodiment of the inventive concept.

FIG. 4 is a block diagram illustrating the first scale-out device of FIG. 3, according to an embodiment of the inventive concept. FIG. 7 is a block diagram illustrating the first scale-out controller of FIG. 4, according to an embodiment of the inventive concept. Referring to FIG. 1 through FIG. 5 and FIG. 7, structure and an operation of each of the scale-out controllers 411-1~411-4 may be substantially identical to each other. Thus, structure and the operation of the first scale-out controller 411-1 will be described representatively.

The first scale-out controller 411-1 may control receiving and transmitting a command and/or data between the non-volatile memory devices. The nonvolatile memory devices may be included in the controller 310, the first volatile memory device 413-1, or the first scale-out storage device 410-1. For example, the first scale-out controller 411-1 may be an IC or an SoC.

The first scale out-controller 411-1 includes a bus structure 420, a fourth interface 421, at least one CPU 423-1 and/or 423-2, an internal memory 425, a buffer controller 427, and a fifth interface 429. The bus structure may be, for example, AMBA, AHB, APB, AXI, ASB, and ACE.

The fourth interface 421 may change a format of a response to transmit to the controller 310. The fourth interface 421 may change a format of data to transmit to the controller 310. The fourth interface 421 may transmit the response and/or the data having the changed format to the controller 310 via the first main channel CHA. The fourth interface 421 may receive the command and/or the data from the controller 310. The fourth interface 421 may change formats of the received command and/or data. The fourth interface 421 may transmit the command having changed format to at least one CPU 423-1 and/or 423-2, and/or a buffer controller 427. The fourth interface 421 may transmit the data having changed format to at least one CPU 423-1 and/or 423-2, and/or the buffer controller 427. For example, the fourth interface 421 may include a transmitter-receiver.

Structure and an operation of the fourth interface 421 may be implemented suitable for the structure and the operation of a third interface 350. For example, the fourth interface 421 may be a SATA interface, a SATAe interface, a SAS interface, a PCIe interface, an NVMe interface, an AHCI interface, an MMC interface, a NAND-type flash memory interface, and a NOR-type flash memory interface.

Referring to FIG. 4 and FIG. 7, the fourth interface 421 may be connected to a channel (or a main channel) or a way. A first terminal PT1 may be used for connecting the first main channel CHA with the fourth interface 421. A third terminal PT3 may be used for connecting the first volatile memory device 413-1 with the buffer controller 427. A second terminal may be used for connecting the fifth interface 429 with one of the channels CH11~CH1m. The terminals may be pins or pads.

One or more CPUs 423-1 and/or 423-3 may control the fourth interface 421, the internal memory 425, the buffer controller 427, and the fifth interface 429 via the bus structure 420. Each CPU 423-1 or 423-3 may include at least one core.

For example, the first CPU 423-1 may transmit and receive data to/from the third interface 350 via the first main channel CHA and the fourth interface 421. The second CPU 423-2 may transmit and receive data to/from at least one nonvolatile memory device which is connected to each of the channels CH11~CH1m via the fifth interface 429. For example, the first CPU 423-1 and the second CPU 423-2 may be included in a multi-CPU. For example, the first CPU 423-1 may control the second CPU 423-2.

The internal memory 425 may store data required to operate the first scale-out controller 415-1. The internal memory 425 may also store data generated by a data processing operation (for example, write operation or read operation). The data processing operation may be executed by the first scale-out controller 415-1. For example, the internal memory 425 may store the second FTL. The second FTL may be executed by the CPU 423-1 or 423-2. For example, when the data storage device 300 is booted, the second FTL may be loaded from the nonvolatile memory of the memory cluster 400 to the internal memory 425. For example, the internal memory may be a RAM, a DRAM, an SRAM, a buffer, a buffer memory, a cache, and a TCM.

The buffer controller 427 may write data to the first volatile memory device 413-1 according to control of the first CPU 423-1 or the second CPU 423-2. The buffer controller 427 may read data from the first volatile memory device 413-1. The buffer controller 427 may be referred to as a controller or a buffer manager which controls the write operation and the read operation regarding the first volatile memory device 413-1.

The fifth interface 429 may control data processing operations regarding the nonvolatile memory devices via a corresponding channel among the plurality of channels CH11~CH1m, according to control of the first CPU 423-1 or the second CPU 423-2.

Referring to FIG. 4 and FIG. 7, the plurality of channels and/or a plurality of ways may be connected to the fifth interface 429. For example, the fifth interface 429 may be a SATA interface, a SATAe interface, a SAS interface, a PCIe interface, an NVMe interface, an AHCI interface, an MMC interface, a NAND-type flash memory interface, and/or a NOR-type flash memory interface. For example, the fifth interface 429 may include memory controllers 429-1~429-m corresponding to channels CH11~CH1m, respectively. For example, when the nonvolatile memory devices are NAND-type flash memories, the memory controllers 429-1~429-m may be NAND flash memory controllers.

The first volatile memory device 413-1 may include a first region and a second region. The first region may store a mapping table for translating a logical address to a physical address regarding nonvolatile memory devices included in the first scale-out storage device 410-1. The second region may be a cache or a buffer. For example, the second FTL may be executed by the CPU 423-1 or 423-2. The second FTL FTL2 may translate a logical address to a physical address using the mapping table stored in the first region.

If one of the nonvolatile memory devices of FIG. 3 is replaced with a scale-out storage device (for example, 410-1), scalability of the memory capacity regarding the memory cluster 400 may increase.

Figure 5:
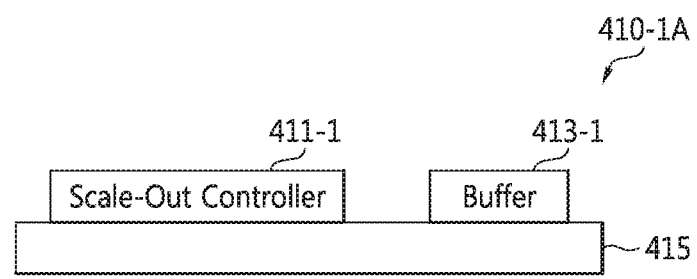
FIG. 5 is a diagram illustrating a semiconductor package of the first scale-out device of FIG. 4, according to an embodiment of the inventive concept.

FIG. 5 is a diagram illustrating a semiconductor package of the first scale-out device of FIG. 4, according to an embodiment of the inventive concept. Referring to FIG. 3, FIG. 4 and FIG. 5, the first scale-out device 410-1A may be a semiconductor package. Namely, the first scale-out device 410-1A includes a first scale-out controller 411-1 and the first volatile memory device 413-1 which are attached or mounted on a substrate 415.

For example, the first scale-out controller 411-1 may be attached on the substrate 415 as a flip-chip structure. Also, when the first scale-out controller 411-1 is attached on the substrate 415 via adhesive material, the first scale-out controller 411-1 may transmit and receive electrical signals to/from the substrate 415 via bonding wires.

For example, the first volatile memory device 413-1 may be attached on the substrate 415 as the flip-chip structure. Also, when the first volatile memory device 413-1 is attached on the substrate 415 via the adhesive material, the first volatile memory device 413-1 may transmit and receive electrical signals to/from the substrate 415 via bonding wires. Namely, the first scale-out controller 411-1 may transmit and receive a command and data to/from the first volatile memory device 413-1 via the substrate 415. A semiconductor package regarding each of the scale-out devices 410-1A~410-4A may be identical.

Figure 6:
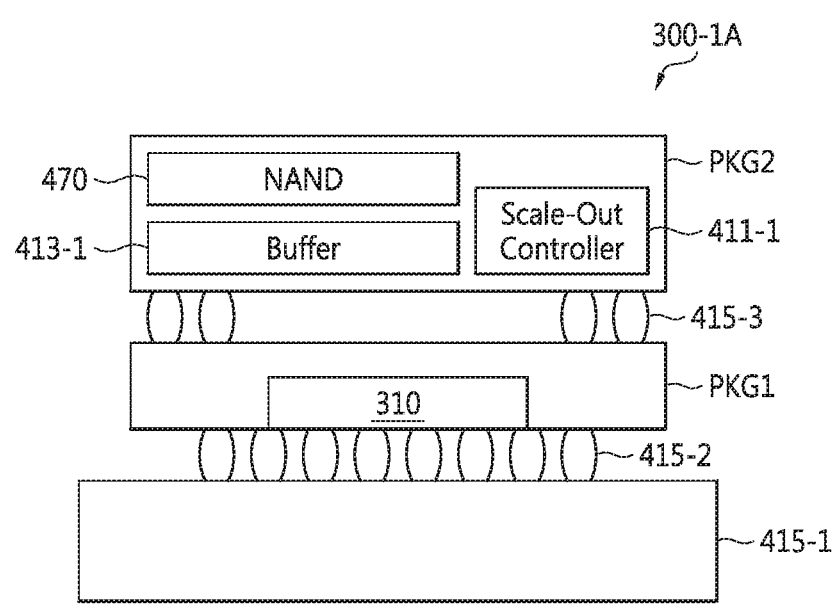
FIG. 6 is a diagram illustrating the semiconductor package including the memory controller and the first scale-out storage device of FIG. 1, according to an embodiment of the inventive concept.

FIG. 6 is a diagram illustrating the semiconductor package including the memory controller and the first scale-out storage device of FIG. 1, according to an embodiment of the inventive concept. The semiconductor package 300-1A of FIG. 6 may be an embedded package on package (ePOP).

For example, the semiconductor package 300-1A includes a substrate 415-1, a first package PKG1, and a second package PKG2. The first package PKG1 may be disposed over the substrate 415-1. The second package PKG2 may be disposed over the first package PKG1. The first package PKG1 may be attached on the substrate 415-1 via first bumps 415-2. The first package PKG1 may transmit and receive electrical signals to/from the substrate 415-1 via the first bumps 415-2. The second package PKG2 may be attached to the first package PKG via second bumps 415-3. The second package PKG2 may transmit and receive electrical signals to/from the substrate 415-1 via the second bumps 415-3. The first package PKG1 includes a controller 310. The second package PKG2 includes a first scale-out controller 411-1, a first volatile memory device 413-1, and at least one NAND-type flash memory 470. For example, each of the scale-out storage devices 410-2, . . . , 410-4 may be implemented as a package. When the scale-out storage device is attached on the substrate 415-1, the controller 310 may control each of the scale-out storage devices 410-2, . . . , 410-4 via the substrate 415-1.

Figure 8:
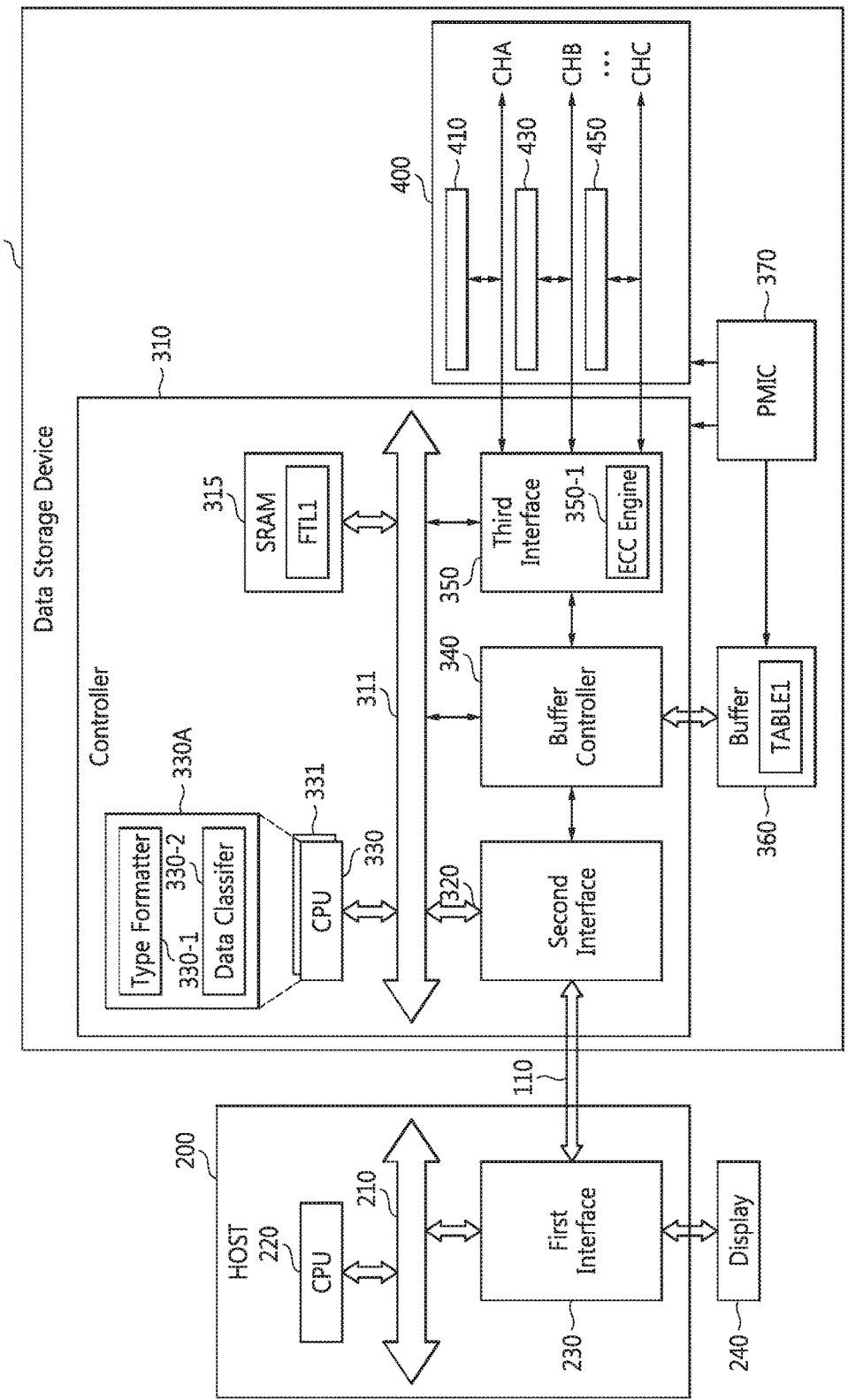
FIG. 8 is a block diagram illustrating a data processing system, according to an embodiment of the inventive concepts.

FIG. 8 is a block diagram illustrating a data processing system, according to an embodiment of the inventive concept. Referring to FIG. 1 and FIG. 8, except for the data classification circuit 317 and the data classification module 330A, the structure and the operation of the data processing system 100 of FIG. 1 may be identical with the structure and the operation of the data processing system 100-1 of FIG. 8.

In FIG. 1, the data classification circuit 317 is implemented as a hardware, and the data classification module of FIG. 8 may be implemented as a software which is executed by the CPU 330 or 331. A function of the hardware formatter 317-1 and a function of the software formatter 330-1 may be identical. A function of the hardware data classifier 317-2 and a function of the software data classifier 330-2 may be identical. Therefore, description regarding to the software data formatter 330-1 and the software data classifier 330-2 will be omitted.

Figure 9:
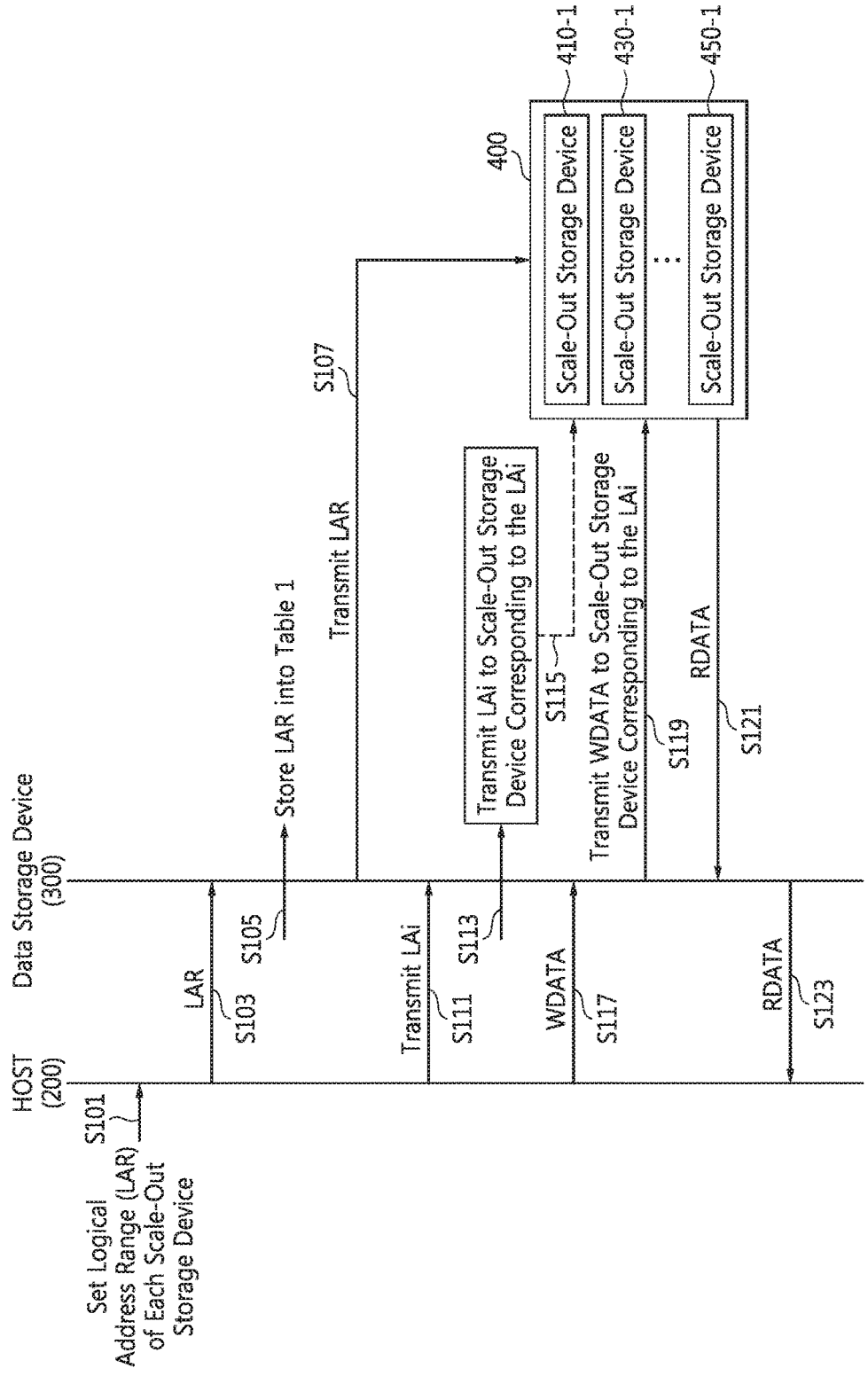
FIG. 9 is a conceptual diagram illustrating a method of assigning logical addresses to the scale-out storage devices using a type formatter, according to an embodiment of the inventive concept.
Figure 10:
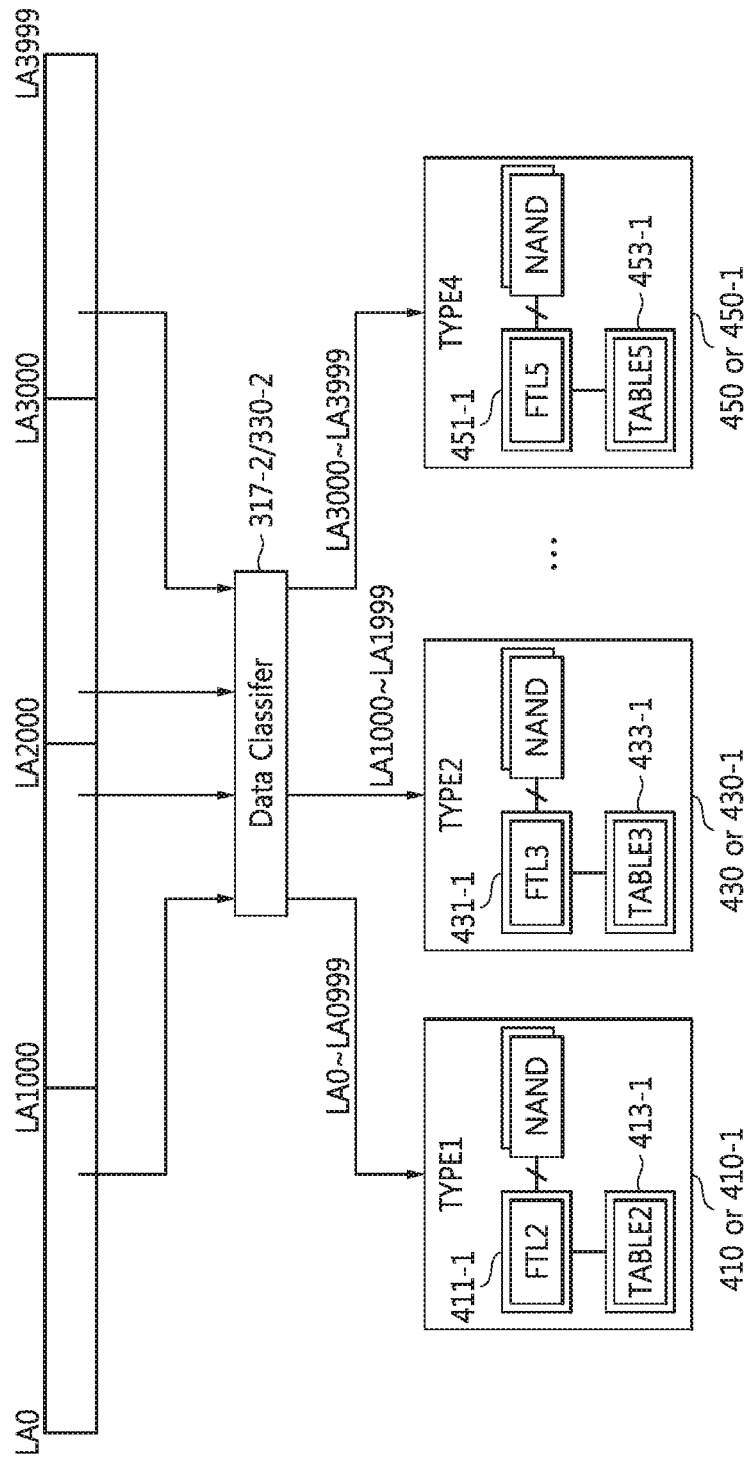
FIG. 10 is a conceptual diagram illustrating a method of transmitting the logical addresses to the scale-out storage devices using the data classifier, according to an embodiment of the inventive concept.
Figure 12:
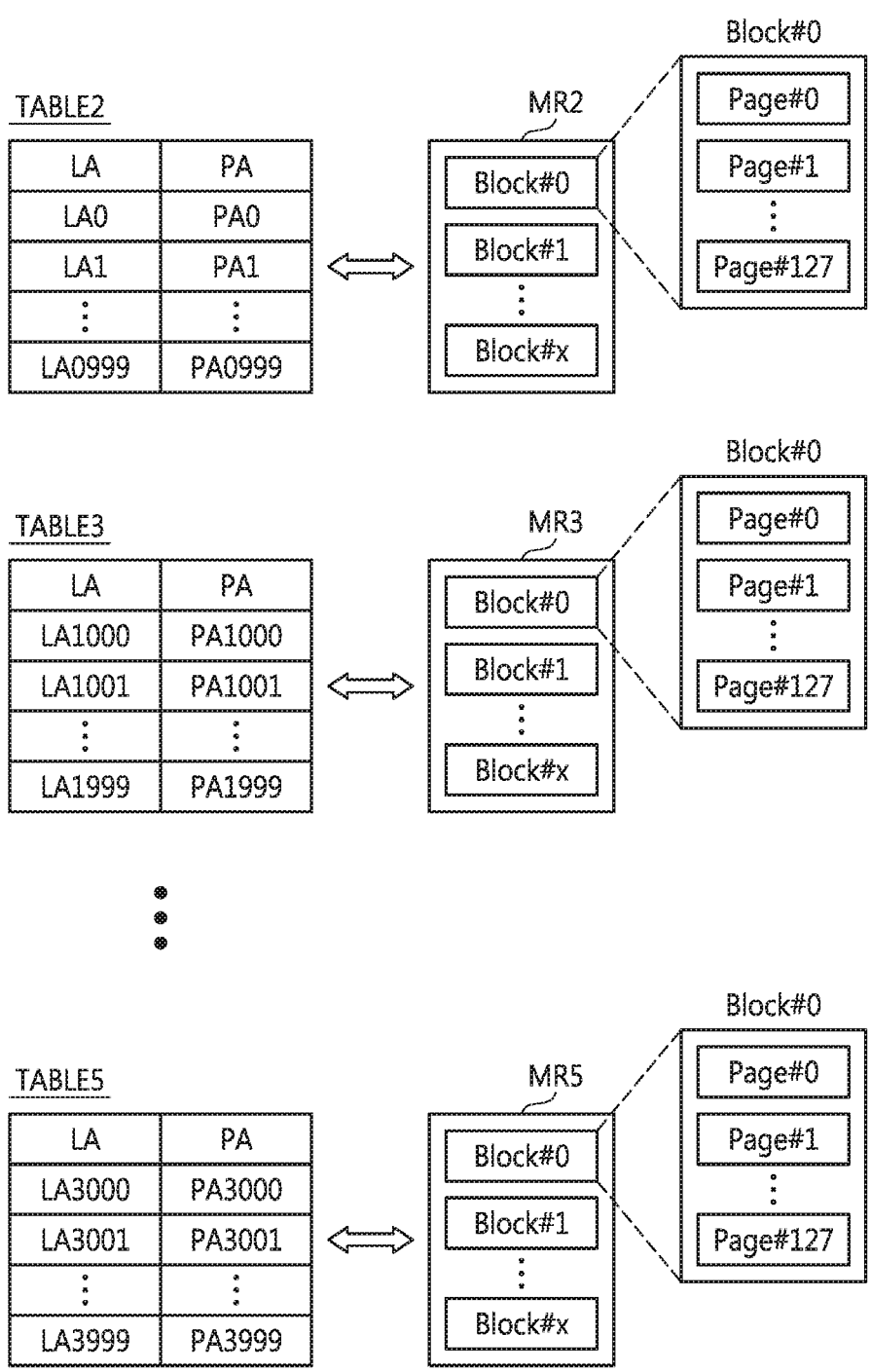
FIG. 12 is a table listing exemplary transformations from logical addresses to physical addresses assigned to the scale-out storage devices, according to an embodiment of the inventive concept.

FIG. 9 is a conceptual diagram illustrating a method of assigning logical addresses to the scale-out storage devices using a type formatter, according to embodiments of the inventive concept. FIG. 10 is a conceptual diagram illustrating a method of transmitting the logical addresses to the scale-out storage devices using the data classifier according to an embodiment of the inventive concept. FIG. 11 is a table listing exemplary logical addresses assigned to the scale-out storage devices, according to an embodiment of the inventive concept. FIG. 12 is a table listing exemplary translations from logical addresses to physical addresses assigned to the scale-out storage devices, according to an embodiment of the inventive concepts.

Referring to FIG. 1 through FIG. 12, the CPU 300 or 331 may execute the type formatter 330-1 for assigning a logical address to each scale-out storage device, according to control of the CPU 220 of the host. Therefore, the display 240 may provide a user interface which may set a range of logical addresses for each scale-out storage device, to a user according to control of the CPU 220 or the type formatter 330-1. The user may set a logical address range of each scale-out storage device via the user interface displayed on the display 240 (S101).

The CPU 220 may transmit the logical address range assigned to each scale-out storage device to the CPU 330 or the type formatter 330-1 (S103). A first table TB1 of FIG. 11 may illustrate logical address ranges LAR assigned to each scale-out storage device.

For example, referring to FIG. 2B, FIG. 9, FIG. 10, and FIG. 11, it is assumed that logical address LA0~LA0999 may be assigned to the first cluster 410 or the first scale-out storage device 410-1. Logical address LA1000~LA1999 may be assigned to the second cluster 430 or the second scale-out storage device 430-1. Logical address LA3000~LA3999 may be assigned to the third cluster 450 or the third scale-out storage device 450-1. Also, for concise description, each of the clusters 410, 430, . . . , 450 may include at least one scale-out storage device 410-1, 430-1, . . . , 450-1.

The CPU 330 or the type formatter 330-1 may store the first table TB1 to the buffer 360 via the buffer controller 340 (S105). The first table TB1 may include logical address ranges LAR. The type formatter 330-1 may transmit a logical address range LAR assigned to each scale-out storage device to the corresponding scale-out storage device using the first table TB1 (S107).

The first scale-out storage device 410-1 may be classified to a first type (TYPE1). The CPU of the first scale-out storage device 410-1 may generate the second table TABLE2 of FIG. 12 using the logical addresses LA0~LA0999. The second FTL FTL2 may be executed by the CPU of the first scale-out storage device 410-1. The second FTL FTL2 may also generate the second table TABLE2 of FIG. 12. The CPU of the first scale-out storage device 410-1 or the second FTL FL2 may store the second table TABLE2 to the first volatile memory 413-1. For example, the second table TABLE2 may be an address mapping table to translate the logical addresses LA0~LA0999 to the physical addresses PA0~PA0999. For example, the physical addresses PA0~PA0999 may be physical addresses regarding pages included in the memory region MR2 of NAND-type flash memory devices included in the first scale-out storage device 410-1. Each of the memory regions MR2, MR3, . . . , MR5 may include x blocks. Herein, x is a natural number equal to or greater than two. It is assumed that each block may include 128 pages.

The second scale-out storage device 430-1 may be classified to the second type (TYPE2). The third FTL may be executed by the CPU of the second scale-out storage device 430-1. The third FTL may generate the third table TABLE3 of FIG. 12 using the logical addresses LA1000~LA1999. The third FTL may store the third table TABLE3 to the second volatile memory 433-1. For example, the third table may be an address mapping table to translate the logical addresses LA1000~LA1999 to physical addresses PA1000~PA1999. For example, the physical addresses PA1000~PA1999 may be physical addresses regarding pages included in a memory region MR3 of NAND-type flash memory devices of the second scale-out storage device 430-1.

The third scale-out storage device 450-1 may be classified as a fourth type. The fifth FTL may be executed by the CPU of the third scale-out storage device 450-1. The CPU of the third scale-out storage device or the fifth FTL may generate a fifth table TABLE5 of FIG. 12 using the logical addresses LA3000~LA3999. The CPU of the third scale-out storage device or the fifth FTL may store the fifth table TABLE5 to the third volatile memory 453-1. For example, the fifth table TABLE5 may be an address mapping table to translate the logical addresses LA3000~LA3999 to the physical addresses PA3000~PA3999. For example, the physical addresses PA3000~PA3999 may be physical addresses regarding the pages included in a memory region MR5 of the NANA-type flash memory device of the third scale-out storage device 450-1.

The host 200 may transmit the logical address LAi (for example, LA0999) to the data storage device 300. The CPU 330 or the data classifier 317-2 or 330-2 may transmit the logical address LAi (for example, LA0999) to the first cluster 410 which is classified to the first type TYPE1 or the first scale-out storage device 410-1 based on the first table TB1 (S115).

When the logical address LAi may be a logical address regarding a write operation, the host 200 may transmit write data WDATA to the data storage device 300 (S117). The CPU 330 or data classifier 317-2 or 330-2, based on the first table TB1 of FIG. 11, may transmit the write data WDATA to the first scale-out storage device 410-1 (S119). The second FTL FTL2 may be executed at the first scale-out storage device 410-1. The second FTL, based on the second table TABLE2 of FIG. 12, may translate the logical address LAi (for example, LA0999) to the physical address (for example, PA0999). Therefore, the write data WDATA may be programmed to the corresponding page of the physical address.

The second FTL FTL2 may be executed in the first scale-out storage device 410-1. When the logical address LAi (for example, LA0999) is a logical address regarding the read operation, the second FTL FTL2 may translate the logical address Lai to the physical address (for example, PA0999) based on the second table TABLE2 of FIG. 12. Thus, the first scale-out storage device 410-1 may read the read data RDATA from the page corresponding to the physical address (for example, PA0999) (S121). The first scale-out storage device 410-1 may transmit the read data RDATA to the host 200 (S123).

The logical address LAi ($0 \leq i \leq 3999$) received from host 200 may be included in a write command or a read command Therefore, when the logical address LAi received from host 200 is one of logical addresses LA1000~LA1999, the controller 310 may transmit and receive data corresponding to the logical addresses LA1000~LA1999 to/from the second scale-out storage device 430-1 classified into the second type TYPE2 using the third table TABLE3. Also, when the logical address LAi received from the host 200 is one of logical addresses LA3000~LA3999, the controller 310 may transmit and receive, using the fifth table TABLE5, data corresponding to the logical addresses of LA 3000~LA 3999 to the third scale-out storage device 450-1 classified into the fourth type TYPE4.

Figure 13:
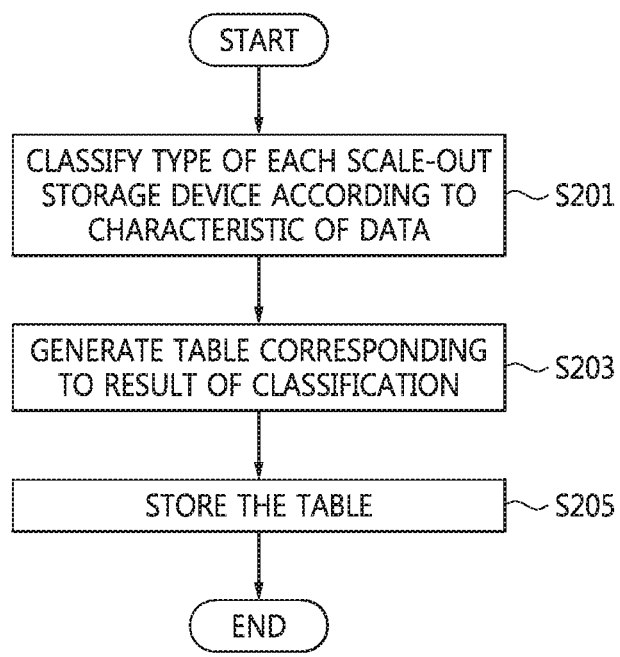
FIG. 13 is a flowchart generally summarizing a method of generating the table regarding to the scale-out storage devices to the data characteristics, according to an embodiment of the inventive concept.
Figure 14:
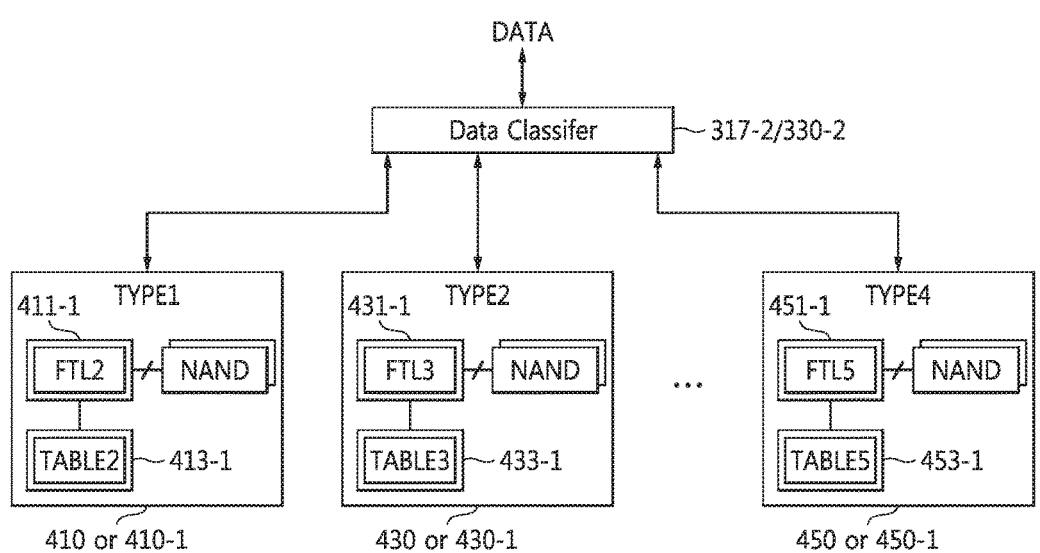
FIG. 14 is a conceptual diagram illustrating a process that the data classifier analyzes the data characteristics and transmits the data to the corresponding scale-out storage device according to the analysis result, according to an embodiment of the inventive concept.

FIG. 13 is a flowchart generally summarizing a method for generating the table regarding the scale-out storage devices corresponding to the data characteristics, according to an embodiment of the inventive concept. FIG. 14 is a conceptual diagram illustrating a process in which the data classifier analyzes the data characteristics and transmits the data to the corresponding scale-out storage device based on the analysis result, according to an embodiment of the inventive concept. FIG. 15 is a table illustrating a method of classifying the scale-out storage devices into a corresponding type of the data characteristic, according to an embodiment of the inventive concept.

In this description, "determining characteristic of data which transmit and receive to/from the host 200" may mean one of the followings:

(1) determining whether data for a sequential access or data for a random access;

(2) determining whether write data (or program data) or read data;

(3) determining whether hot data or cold data; and/or (4) determining whether large size data or small size data. However, the inventive concepts may not be limited thereto.

Figure 16:
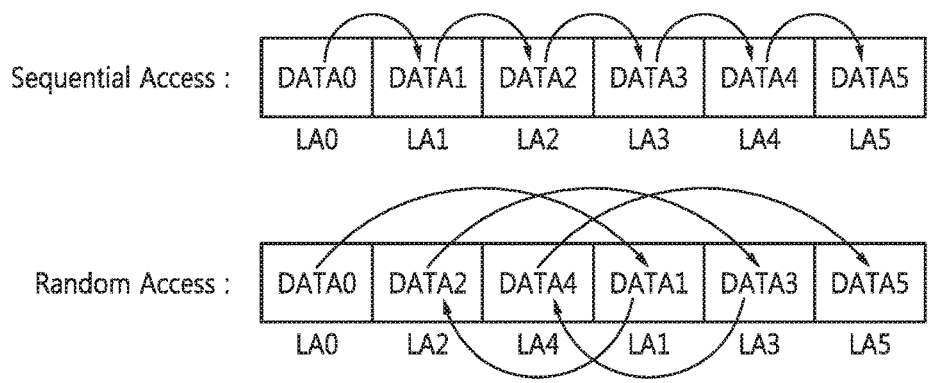
FIG. 16 is a conceptual diagram illustrating a random access and sequential access, according to an embodiment of the inventive concept.

FIG. 16 is a conceptual diagram illustrating a random access and a sequential access, according to an embodiment of the inventive concept. As illustrated in FIG. 16, the sequential access may mean that the logical addresses LA0~LA5 are sequential. The sequential access may also mean that accesses (write or read) regarding stored data DATA0~DATA5 of a storage region corresponding to the logical addresses LA0~LA5 are sequential. The random access may mean that the logical addresses LA0~LA5 are random. The random access may also mean that accesses regarding stored data DATA0~DATA5 of a storage region corresponding to the logical addresses LA0~LA5 are random.

The hot data may be data which is accessed frequently by the host 200 or the controller 310. The cold data may be data accessed infrequently by the host 200 or the controller 310.

Referring to FIG. 15, the CPU 330 or the type formatter 317-1 or 330-2 may classify each scale-out storage data into one of types. The CPU 330 or the type formatter 317-1 or 330-2 may format each scale-out storage data. According to embodiments of the inventive concept, each type may be determined by each cluster. Also, according to embodiments of the inventive concept, each type may be determined by each scale-out storage device regardless of the cluster.

Referring to FIG. 15, it is assumed that the CPU 330 or the type formatter 317-1 or 330-2 may determine the type of each cluster according to at least one of the following items and/or data characteristics. It is also assumed that each cluster includes at least one scale-out storage device.

(1) operation clock frequency (in the following, referred to as a "clock frequency") of the controller 310 and/or the scale-out controller of each scale-out storage device;

(2) capacity and/or bandwidth of the volatile memory 413-1, 433-1, ..., 453-1 connected to the scale-out controller, and/or the volatile memory 360 connected to the controller 310;

(3) program method regarding the NAND-type flash memory device included in each scale-out storage device;

(4) FTL mapping size to manage write data and read data of the NAND-type flash memory device included in each scale-out storage device;

(5) ratio (OVP RATIO) of the user data region and the over-provisioning region of the NAND-type flash memory device included in each scale-out storage device;

(6) capacity of the NAND-type flash memory device included in each scale-out storage device. However, the inventive concepts are not limited thereto.

The program method may include a single level cell (SLC) program method, a multi-level cell (MLC) program method, and a triple level cell (TLC) program method. The SLC program method may program 1-bit data to a single cell. The MLC program method may program 2-bit data to the single cell. The TLC program method may program 3-bit data to the single cell.

For example, if bit per cell (bpc) increases, a program erase cycle may decrease, and read time, write time and erase time may increase. If bit per cell (bpc) decreases, the reliability of data may increase.

The FTL mapping size may mean a size to manage write data and read data of the NAND-type flash memory device. The FTL mapping size may be 4 KB, 8 KB, or 16 KB. For example, if the FTL mapping size increases, a size of a mapping table for the logical address and the physical address may decreases.

If the ratio OVP RATIO of the user data region and the over-provisioning region increases, the performance and life time of the NAND-type flash memory device may increase.

The CPU 330 or the type formatter 317-1 or 330-2 may determine a type of each cluster according to at least one data characteristic. The CPU 330 or the type formatter 317-1 or 330-2 may store the sixth table TB6 including the determined type of each cluster to the buffer 360.

The CPU 220 of the host 200 may execute the type formatter 317-1 or 330-2, and the CPU 300 of the controller 310-1 for determining the type of each scale-out storage device based on at least one data characteristic. Thus, the display 240 may provide a user interface to a user according to the control of the CPU 220 or the control of the type formatter 317-1 or 330-2. A user may set types of the scale-out storage device, respectively, via the user interface which is displayed on the display 240. For example, the type of each scale-out storage device may be set as a default by the manufacturer of the data storage device 300.

The manufacturer or user may set a type of each scale-out storage device according to at least one item among the items of FIG. 15. The CPU 300 or the type formatter 317-1 or 330-2 may classify the type of each scale-out storage device (S201). The CPU 300 or the type formatter 317-1 or 330-2 may generate the sixth table TB6 according to the classification result (S203). The CPU 300 or the type formatter 317-1 or 330-2 may store the sixth table TB6 to the buffer 360 (S205). The CPU 300 or type formatter 317-1 or 330-2 may transmit information regarding each scale-out storage device type to each scale-out storage device. Therefore, each scale-out storage device may store information regarding its own type to the volatile memory.

As illustrated in FIG. 14, the first cluster 410 or the first scale-out storage device 410-1 may be classified into the first type TYPE1 by the CPU 300 or the type formatter 317-1 or 330-1. The second cluster 430 or the second scale-out storage device 430-1 may be classified into the second type TYPE2. The third cluster 450 or the third scale-out storage device 450-1 may be classified into the fourth type TYPE4.

When the host transmits data, the data classifier 317-2 or 330-2 may determine characteristic of the data. The data classifier 317-2 or 330-2 may determine a scale-out device to transmit the data among the scale-out devices 410-1, 430-1, ..., 450-1 using the determined characteristic or the sixth table TB6 of FIG. 15.

The data classifier 317-2 or 330-2 may determine the type of the data or the characteristic of the data. The data classifier 317-2 or 330-2 may transmit the data to a corresponding scale-out storage device according to the determined characteristic. The data transmitted from the host 200 may be hot data, cold data, program data, read data, random data, sequential data, user data and/or meta data.

For example, when the data received from the host 200 is the hot data or the random data, the data classifier 317-2 or 330-2 may store the data in the third scale-out storage device 450-1 classified into the fourth type TYPE4, using the sixth table TB6 and/or the determined characteristic. As illustrated in FIG. 15, the third scale-out storage device 450-1 may have a small FTL mapping size (for example, 4 KB) and a high ratio (OVP RATIO), and may use an SLC (or MLC) program method.

When the data received from the host 200 is the cold data or the sequential data, the data classifier 317-2 or 330-2 may store the data in the scale-out storage device classified into the third type TYPES using the sixth table TB6 and/or the determined characteristic. As illustrated in FIG. 15, the scale-out storage device may have a large FTL size (for example, 8 KB) and a low ratio (OVP RATIO), and may use a TLC program method.

When the data received from the host 200 is required to be processed fast, the data classifier 317-2 or 330-2 may store the data in the second scale-out storage device 430-1 classified into the second type TYPE2, using the sixth table TB6 of FIG. 15 and/or the determined characteristic. As illustrated in FIG. 15, the second scale-out storage device 430-1 may use a high clock frequency and a high bandwidth, and may use the SLC or the MLC program method.

When the data received from the host 200 is required a high reliability (for example, meta data), the data classifier 317-2 or 330-2 may store the data in the first scale-out storage device 410-1 classified into the first type TYPE1 using the sixth table TB6 of FIG. 15 and/or the determined characteristic. As illustrated in FIG. 15, the first scale-out storage device 410-1 may use a low clock frequency, a low band width and a large FTL mapping size (for example, 8 KB), and may use the SLC program method.

When the data received from the host 200 is not required to be processed fast, or the data is required to be processed with low power consumption, the data classifier 317-2 or 330-2 may store the data in the scale-out storage device having a low clock frequency, a low bandwidth, such as the first scale-out storage device 410-1, according to the sixth table TB6 of FIG. 15 and/or the determined characteristic.

Figure 17:
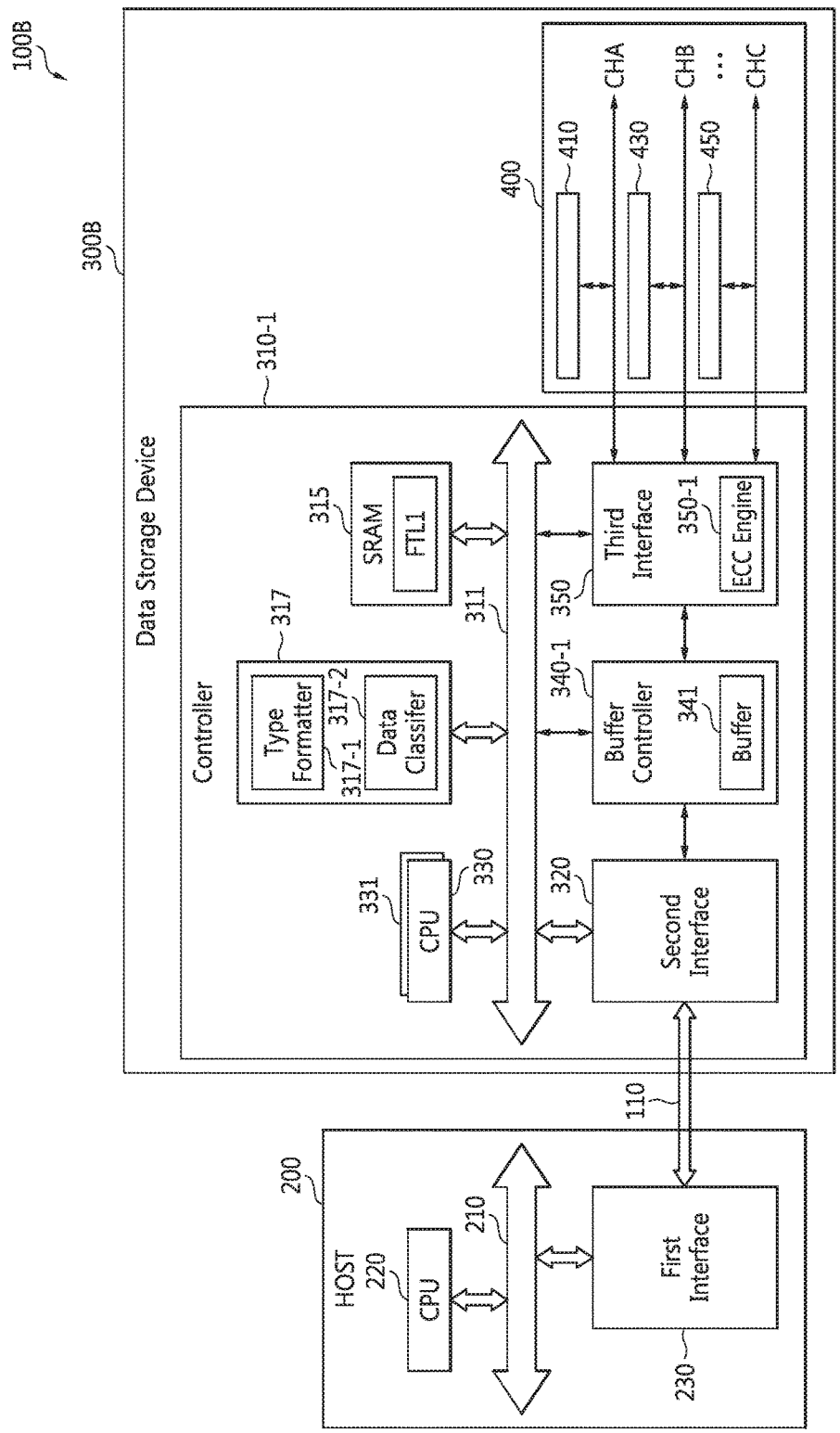
FIG. 17 is a block diagram illustrating a data processing system, according to an embodiment of the inventive concept.

FIG. 17 is a block diagram illustrating a data processing system according to embodiments of the inventive concept. Referring to FIG. 1 through FIG. 17, the data processing system 100B may include a host 200 and a DRAM-less data storage device 300B. The data processing system 100B may further include the display 240 of FIG. 1.

For example, the data processing system 100B may be a mobile computing device. The DRAM-less data storage device 300B may include a controller 310-1 and a memory cluster 400. The DRAM-less data storage device 300B may be an eMMC.

The buffer controller 340-1 may not perform a data processing regarding an external buffer. When performing a write operation or a read operation, the buffer controller 340-1 may transmit data to the second interface 320 or the third interface 350 using the internal buffer 341. Except for an operation of the buffer controller 340-1, the structure of the operation of the controller 310-1 of FIG. 17 may be the same as the structure and the operation of the controller 310 of the FIG. 1. Thus, description regarding to the controller 310-1 will be omitted. For example, the first table TB1 or the sixth table TB6 which can be stored in the buffer 360 of FIG. 1 may be stored in the internal buffer 341.

Figure 18:
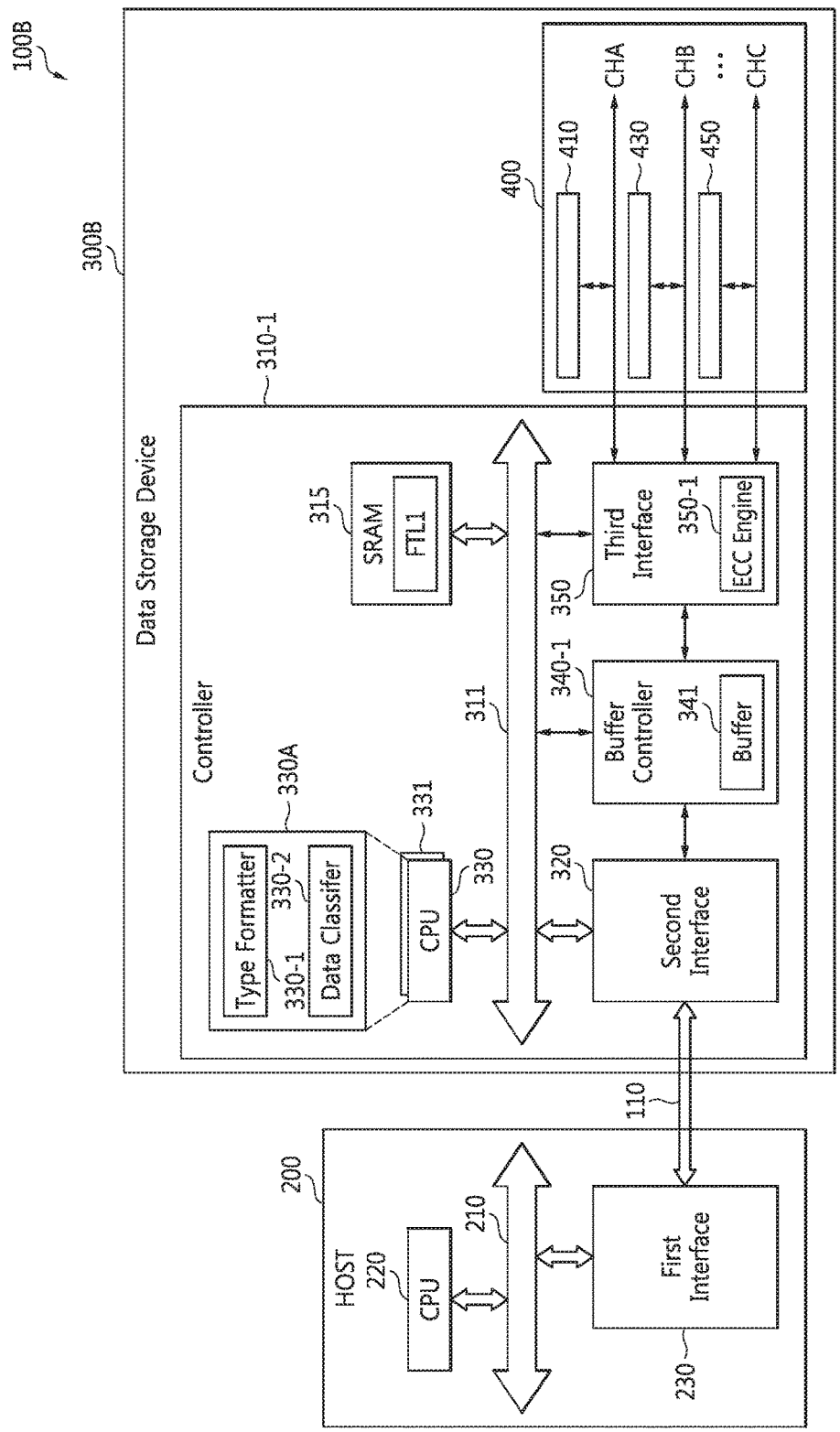
FIG. 18 is a block diagram illustrating a data processing system, according to another embodiment of the inventive concept.

FIG. 18 is a block diagram illustrating a data processing system, according to another embodiment of the inventive concept. Referring to FIG. 17 and FIG. 18, except for the data classification circuit 317 and the data classification module 330A, the structure and the operation of the data processing system 100B of FIG. 17 may be the same as the structure and the operation of the data processing system 100B of FIG. 18.

The data classification circuit 317 of FIG. 17 is implemented as a hardware. The data classification module 330A of FIG. 18 may be implemented as a software executed in the CPU 330 and/or 331. Function of a hardware type formatter 317-1 may be the same as a function of a software type formatter 330-1. Function of hardware data classifier 317-2 may be the same as function of the software type formatter 330-1. Therefore, description regarding to the function of the software type formatter 330-1 and the function of the software type formatter 330-1 will be omitted.

Figure 19:
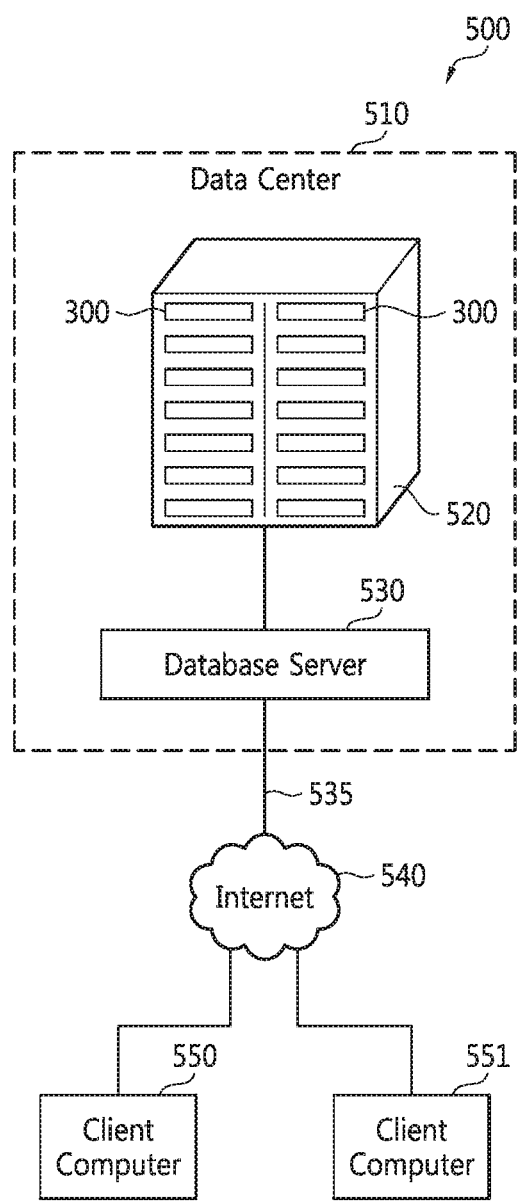
FIG. 19 is a block diagram illustrating a data processing system, according to an embodiment of the inventive concept.

FIG. 19 is a block diagram illustrating a data processing system, according to an embodiment of the inventive concept. Referring to FIG. 1 through FIG. 19, the data processing system 500 includes a data base 520, a database server 530, a second network 540, and a plurality of client computers 550 and 551. The data center 510 may be an internet data center, or a cloud data center. The data center 510 may include the data base 520 and the data base server 530.

The data base 520 may include a plurality of data storage devices 300 or 300B (referred to as "300"). The plurality of data storage devices 300 may be installed in a rack. Structure and an operation of each data storage device 300 may be the same as the structure and the operation of the data storage device of FIG. 1 through FIG. 18.

The data base server 530 may control each data storage device 300. For example, the data base server 530 may perform a function of the host 200 of FIG. 1. The data base server 530 may be connected to the second wireless network 540 via the first network 535. The first network may be a local area network LAN. The second wireless network 540 may be an internet or a wi-fi. The plurality of client computers 550 and 551 may be connected to the data base server 530 via the second wireless network 540, respectively.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

The above-disclosed subject matter is to be considered illustrative in nature, and the scope of the following claims extends over many modifications and enhancements that will become apparent to those of ordinary skill in the art upon consideration of the foregoing. Thus, to the maximum extent allowed by law, the scope of the claims shall be determined by the broadest permissible interpretation, and shall not be restricted or limited to only the foregoing illustrated embodiments.

What is claimed is:

1. A data storage device, comprising:
   a plurality of scale-out storage devices, each of the plurality of scale-out storage devices including a volatile memory, a nonvolatile memory, and a scale-out controller configured to control the volatile memory and the nonvolatile memory; and
   a controller configured to communicate with and control the plurality of scale-out storage devices through a main channel, respectively,
   wherein the controller is further configured to determine a characteristic of write data and a type of each of the plurality of scale-out storage devices, and to transmit the write data to one of the plurality of scale-out storage devices based on the characteristic of the write data and the type of the each of the plurality of scale-out storage devices,
   wherein the controller is further configured to assign logical addresses to the each of the plurality of scale-out storage devices based on the type of the each of the plurality of scale-out storage devices,
   wherein the characteristic of the write data is determined by a logical address of the write data,
   wherein the logical address of the write data transmitted to the one of the plurality of scale-out storage devices is assigned to the one of the plurality of scale-out storage devices, and
   wherein the controller is further configured to transmit the write data to the one of the plurality of scale-out storage devices to which the logical address of the write data is assigned, from among the plurality of scale-out storage devices.

2. The data storage device of claim 1, wherein the controller comprises a user interface configured to receive a user input for determining the type of the each of the plurality of scale-out storage devices.

3. The data storage device of claim 2, wherein the controller further comprises:
   a data classification module including a type formatter and a data classifier; and
   a central processing unit (CPU) configured to execute the type formatter to determine the type of the each of the plurality of scale-out storage devices based on the user input, and execute the data classifier to determine the characteristic of the write data and to transmit the write data to the one of the plurality of scale-out storage devices based on the characteristic of the write data and the type of the each of the plurality of scale-out storage devices.

4. The data storage device of claim 1, wherein the type of the each of the plurality of scale-out storage devices is determined according to at least one of an operation clock frequency of the scale-out controller, a bandwidth of the volatile memory, a program method for the nonvolatile memory, a mapping size of a flash translation layer (FTL) that manages data stored in the nonvolatile memory, a ratio of a user data region and an over-provisioning region of the nonvolatile memory, and a capacity of the nonvolatile memory.

5. The data storage device of claim 1, wherein the scale-out controller of the one of the plurality of scale-out storage devices is configured to program the write data in the nonvolatile memory of the one of the plurality of scale-out storage devices using a table stored in the volatile memory of the one of the plurality of scale-out storage devices.

6. The data storage device of claim 5, wherein the table stored in the volatile memory of the one of the plurality of scale-out storage devices includes mapping information regarding a logical address of the write data and a physical address of the nonvolatile memory of the one of the plurality of scale-out storage devices.

7. The data storage device of claim 1, wherein the controller is further configured to receive a read command including a logical address of read data from an external host, and to transmit the logical address of the read data to at least one of the plurality of scale-out storage devices to which the logical address of the read data is assigned, from among the plurality of scale-out storage devices,
the scale-out controller of the one of the plurality of scale-out storage devices is further configured to read the read data from the nonvolatile memory of the one of the plurality of scale-out storage devices to which the logical address of the read data is assigned using a table stored in the volatile memory of the one of the plurality of scale-out storage devices to which the logical address of the read data is assigned, and the table stored in the volatile memory of the one of the plurality of scale-out storage devices to which the logical address of the read data is assigned includes mapping information regarding the logical address of the read data and a physical address of the nonvolatile memory of the one of the plurality of scale-out storage devices to which the logical address of the read data is assigned.

8. The data storage device of claim 7, wherein the controller comprises a host interface configured to receive the write data and the read command from an external host and to transmit the read data to the external host.

9. The data storage device of claim 1, further comprising:
an external volatile memory connected to the controller and configured to store a table including information about the logical addresses assigned to the each of the plurality of scale-out storage devices.

10. The data storage device of claim 1, wherein the characteristic of the write data comprises at least one of a characteristic of whether the write data is data for a sequential access or a random access, whether the write data is hot data or cold data, and whether the write data is large data or small data.

11. The data storage device of claim 1, wherein a volatile memory and a scale-out controller included in at least one of the plurality of scale-out storage devices are packaged in a multi-chip package.

12. A data storage device, comprising:
a plurality of scale-out storage devices, each of the plurality of scale-out storage devices including a volatile memory, a nonvolatile memory, and a scale-out controller configured to control the volatile memory and the nonvolatile memory; and
a controller configured to communicate with and control the plurality of scale-out storage devices through a main channel, respectively,
wherein the controller comprises:
a first interface configured to receive data from an external host;
a second interface connected to the plurality of scale-out storage devices via the main channel; and
a data classification circuit configured to determine a characteristic of the data and a type of each of the plurality of scale-out storage devices, and to transmit the data to one of the plurality of scale-out storage devices via the second interface based on the characteristic of the data and the type of the each of the plurality of scale-out storage devices,
wherein the data classification circuit is further configured to assign logical addresses to the each of the plurality of scale-out storage devices based on the type of the each of the plurality of scale-out storage devices,
wherein the characteristic of the data is determined by a logical address of the data, and
wherein the logical address of the data transmitted to the one of the plurality of scale-out storage devices is assigned to the one of the plurality of scale-out storage devices, and
wherein the data classification circuit is further configured to transmit the data to the one of the plurality of scale-out storage devices to which the logical address of the data is assigned, from among from the plurality of scale-out storage devices.

13. The data storage device of claim 12, wherein the controller further comprises a user interface configured to receive a user input for determining the type of the each of the plurality of scale-out storage devices.

14. The data storage device of claim 12, wherein the type of the each of the plurality of scale-out storage devices is determined according to at least one of an operation clock frequency of the scale-out controller, a bandwidth of the volatile memory, a program method for the nonvolatile memory, a mapping size of a flash translation layer (FTL) that manages data stored in the nonvolatile memory, and a ratio of a user data region and an over-provisioning region of the nonvolatile memory.

15. The data storage device of claim 12, wherein the characteristic of the data comprises at least one of a characteristic of whether the data is data for a sequential access or a random access, whether the data is write data or read data, whether the data is hot data or cold data, and whether the data is large data or small data.

16. The data storage device of claim 12, wherein the data classification circuit comprises:
a type formatter configured to determine the type of the each of the plurality of scale-out storage devices; and
a data classifier configured to determine the characteristic of the data and determine the one of the plurality of scale-out storage devices to which the data is transmitted, from among the plurality of scale-out storage devices.

\* \* \* \* \*